(12) United States Patent
Giziewicz et al.

(10) Patent No.: US 10,197,748 B2
(45) Date of Patent: Feb. 5, 2019

(54) CONNECTOR DEVICE FOR CONNECTING AT LEAST ONE OPTICAL FIBER END PIECE TO AN ELECTRIC TERMINAL

(71) Applicant: Corning Optical Communications LLC, Hickory, NC (US)

(72) Inventors: Wojciech Piotr Giziewicz, Berlin (DE); Christopher Paul Lewallen, Hudson, NC (US); James Phillip Luther, Hickory, NC (US); Jerald Lee Overcash, China Grove, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/691,020

(22) Filed: Aug. 30, 2017

(65) Prior Publication Data
US 2017/0363821 A1 Dec. 21, 2017

Related U.S. Application Data

(63) Continuation of application No. PCT/US2016/019539, filed on Feb. 25, 2016.
(Continued)

(51) Int. Cl.
*G02B 6/42* (2006.01)
*G02B 6/38* (2006.01)

(52) U.S. Cl.
CPC .......... *G02B 6/4214* (2013.01); *G02B 6/425* (2013.01); *G02B 6/428* (2013.01); *G02B 6/4232* (2013.01); *G02B 6/4244* (2013.01); *G02B 6/4284* (2013.01); *G02B 6/4292* (2013.01); *G02B 6/3885* (2013.01); *G02B 6/4249* (2013.01)

(58) Field of Classification Search
None
See application file for complete search history.

(56) References Cited

U.S. PATENT DOCUMENTS 7,118,293 B2 * 10/2006 Nagasaka ............ G02B 6/4214
385/89
9,140,866 B2 * 9/2015 Lee .......................... G02B 6/43
(Continued)

FOREIGN PATENT DOCUMENTS

WO 2013052748 A2 4/2013

OTHER PUBLICATIONS

International Search Report and Written Opinion of the Internaitonal Searching Authority: PCT/US2016/019539 dated May 4, 2016.

*Primary Examiner* — Sung H Pak
(74) *Attorney, Agent, or Firm* — Michael E. Carroll, Jr.

(57) ABSTRACT

The application provides a connector device for connecting at least one optical fiber endpiece to an electric terminal. The connector device comprises a printed circuit board and an electric connector plug connectable to an electric terminal. A fiber end piece holder is mounted or mountable in an orientation enabling light propagation parallel to the printed circuit board, whereas an optoelectronic chip comprising optoelectronic active elements enables emission and/or detection of light substantially normal to the printed circuit board. A layered optical stack is provided on the printed circuit board, which layered optical stack comprises a reflection surface for changing the propagation direction between parallel and normal to the printed circuit board.

32 Claims, 16 Drawing Sheets

Related U.S. Application Data

(60) Provisional application No. 62/128,632, filed on Mar. 5, 2015.

(56) References Cited

U.S. PATENT DOCUMENTS

| | | |
|---|---|---|
| 9,164,249 B2 | 10/2015 | Mathai et al. |
| 9,748,297 B2 | 8/2017 | Heimgartner et al. |
| 2008/0008426 A1 | 1/2008 | Nagasaka |
| 2010/0171023 A1* | 7/2010 | Asahi .................. G02B 6/4201 250/205 |
| 2010/0328743 A1 | 12/2010 | Wolterink et al. |
| 2011/0123151 A1* | 5/2011 | Zbinden ............... G02B 6/4214 385/33 |
| 2013/0286614 A1 | 10/2013 | Tan et al. |
| 2013/0287406 A1* | 10/2013 | Huang ................. G02B 6/4292 398/139 |

* cited by examiner

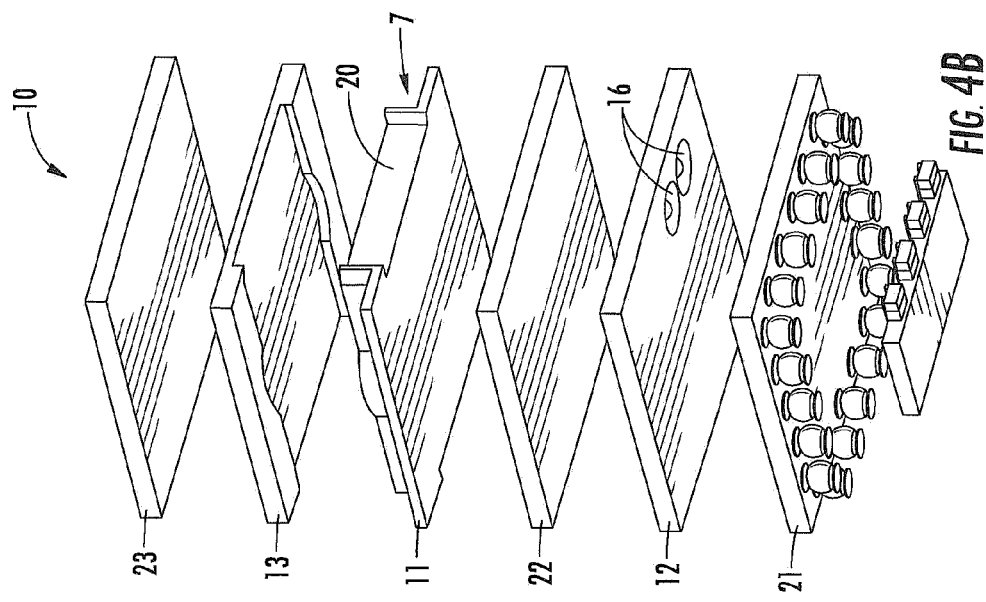
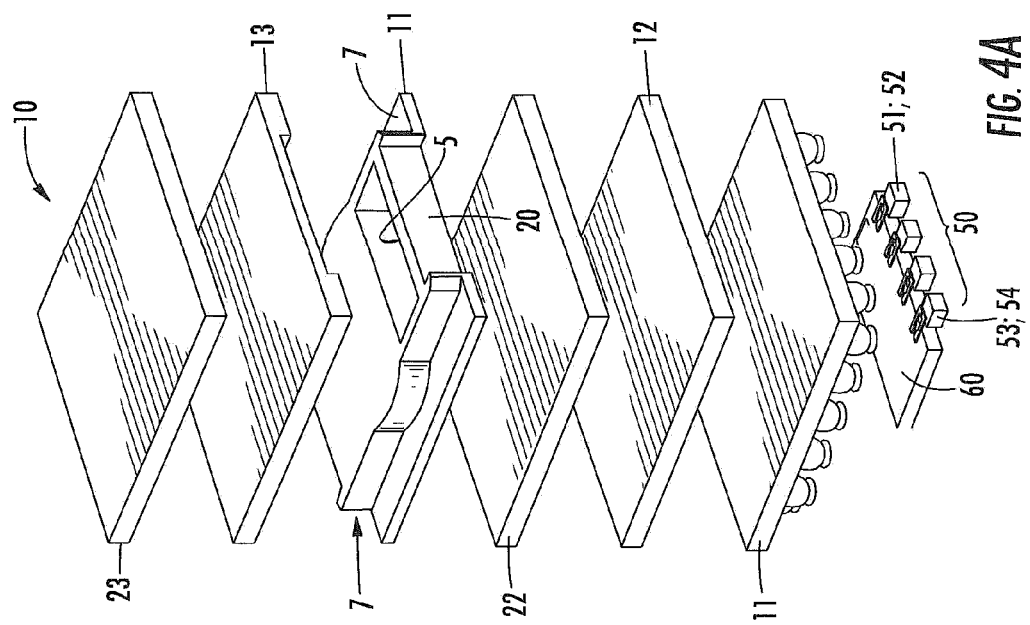

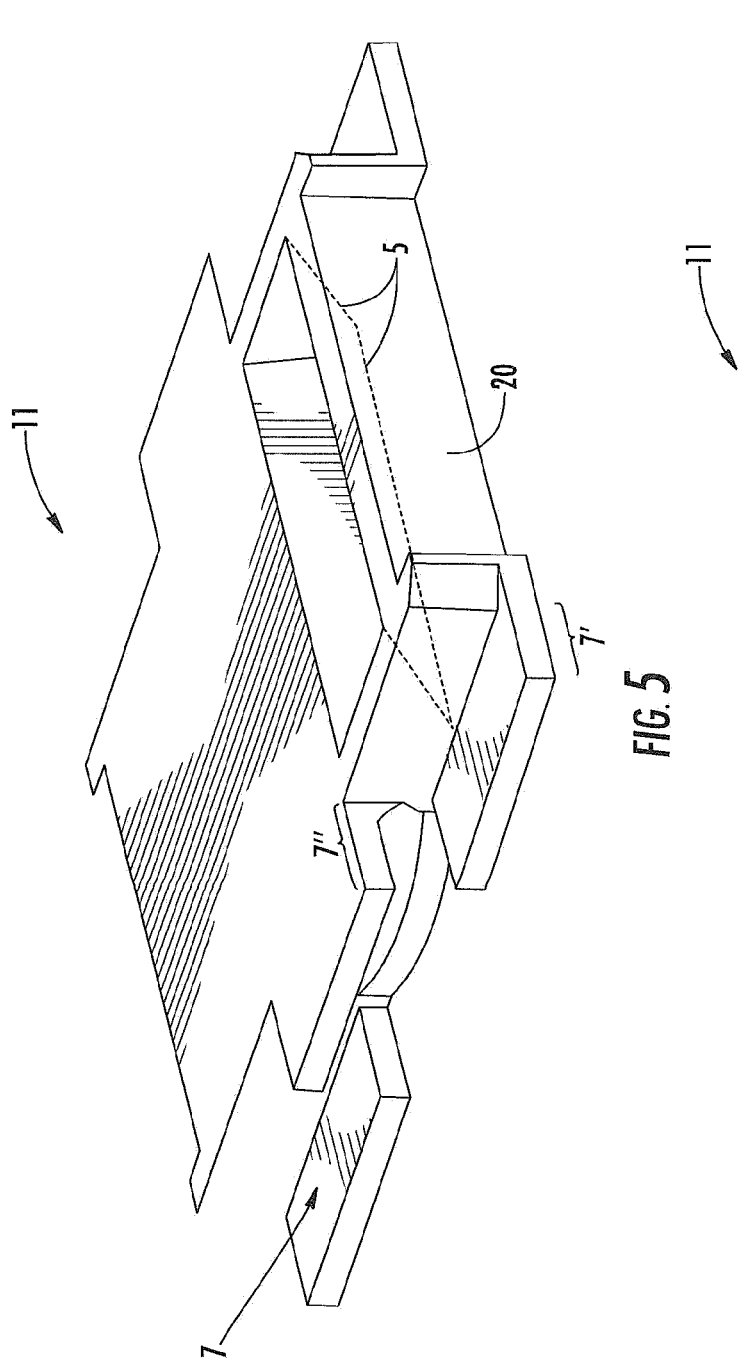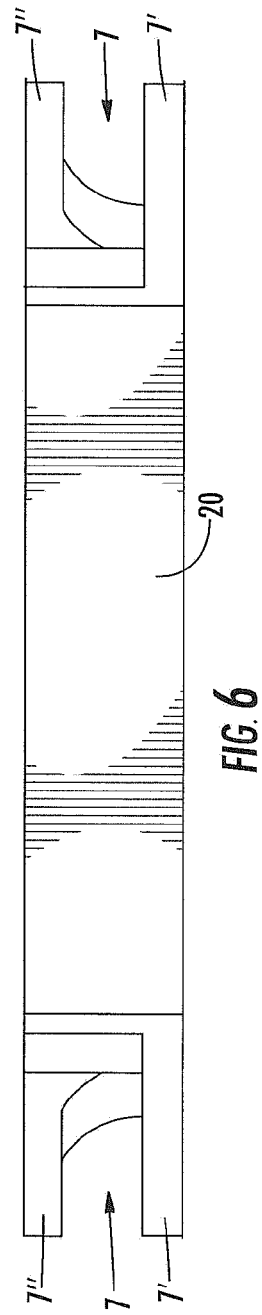
FIG. 5
FIG. 6

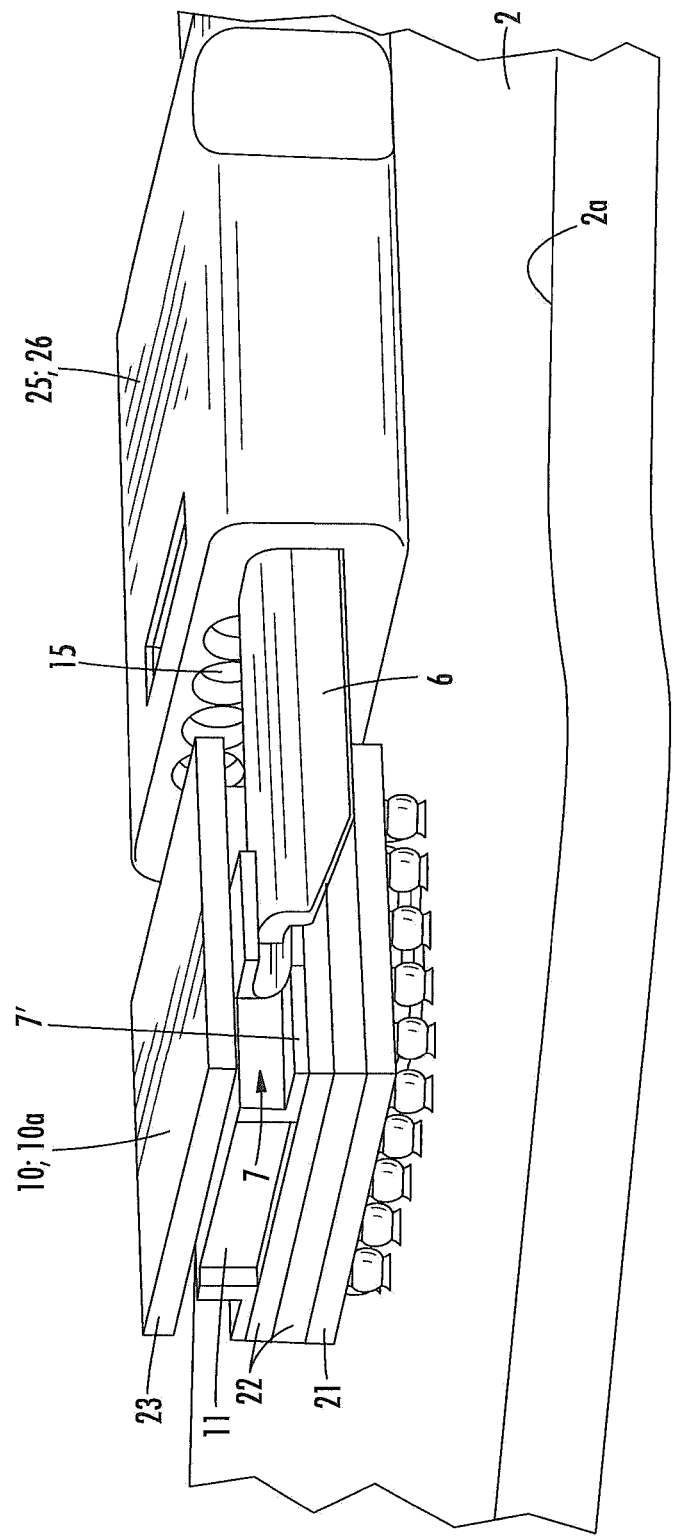

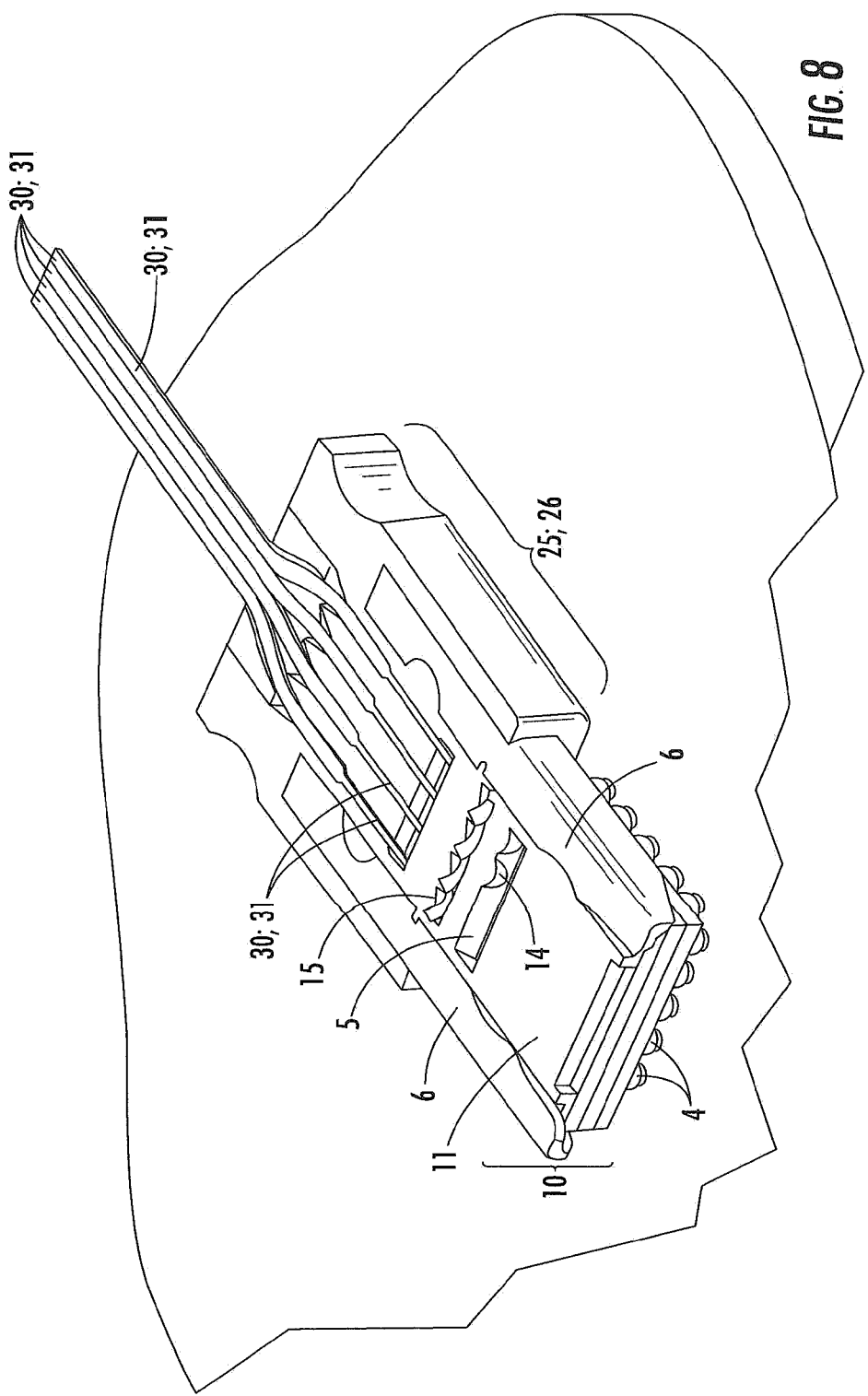

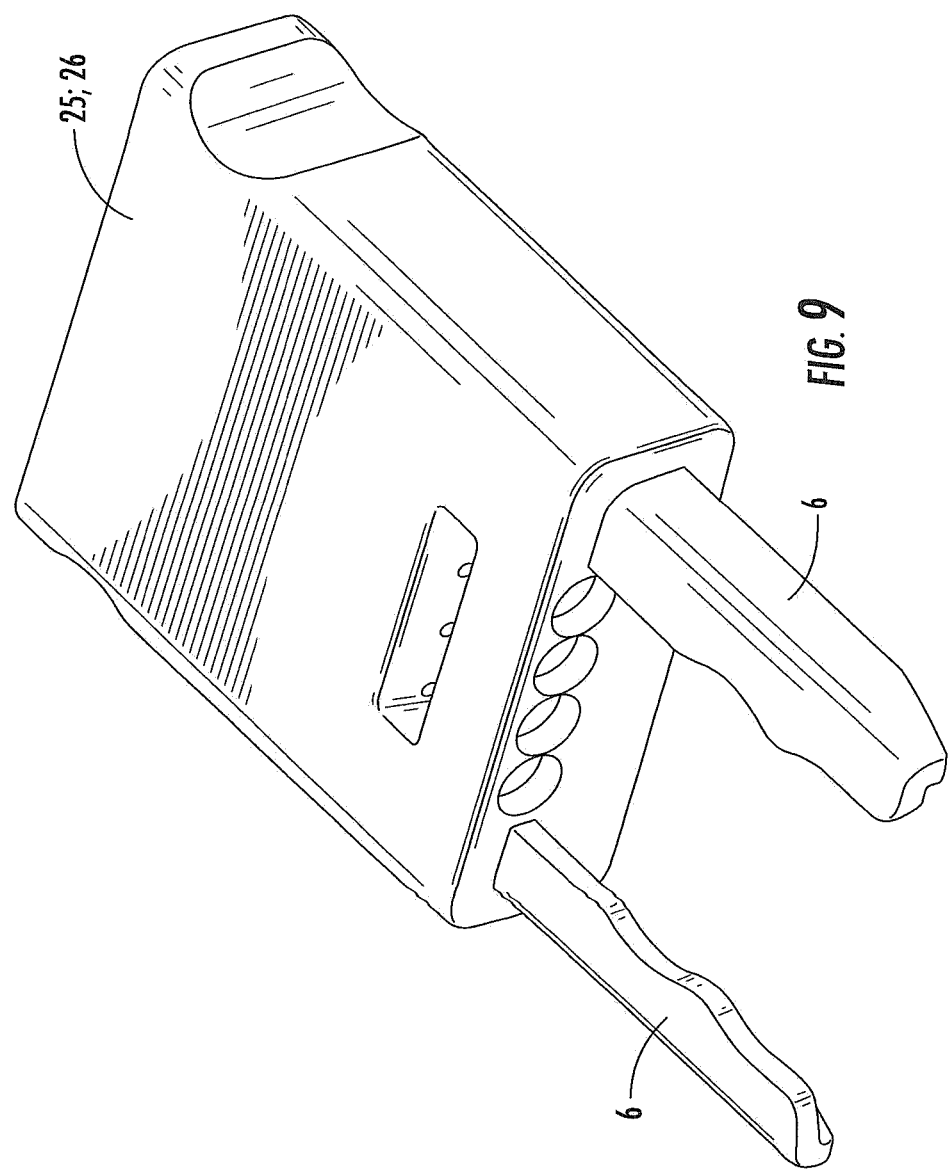

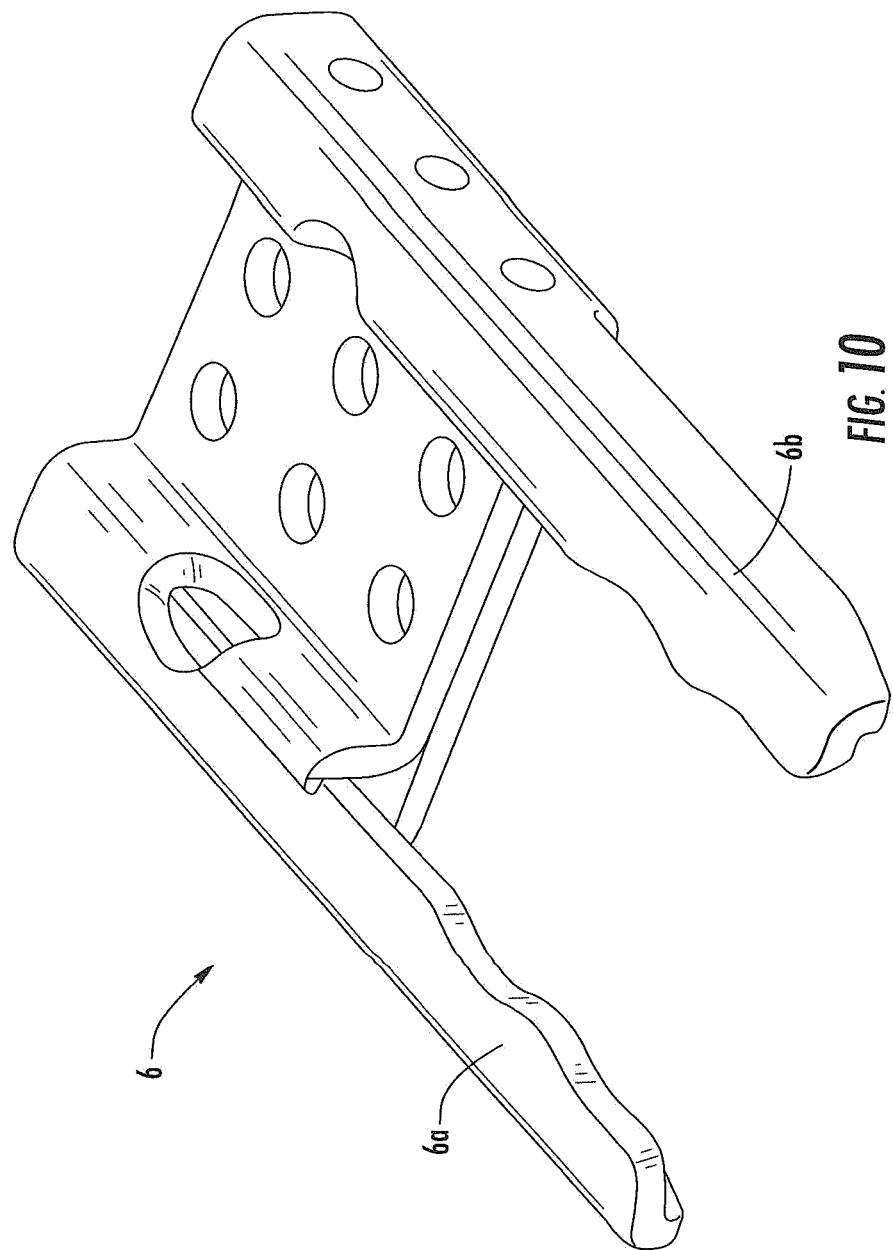

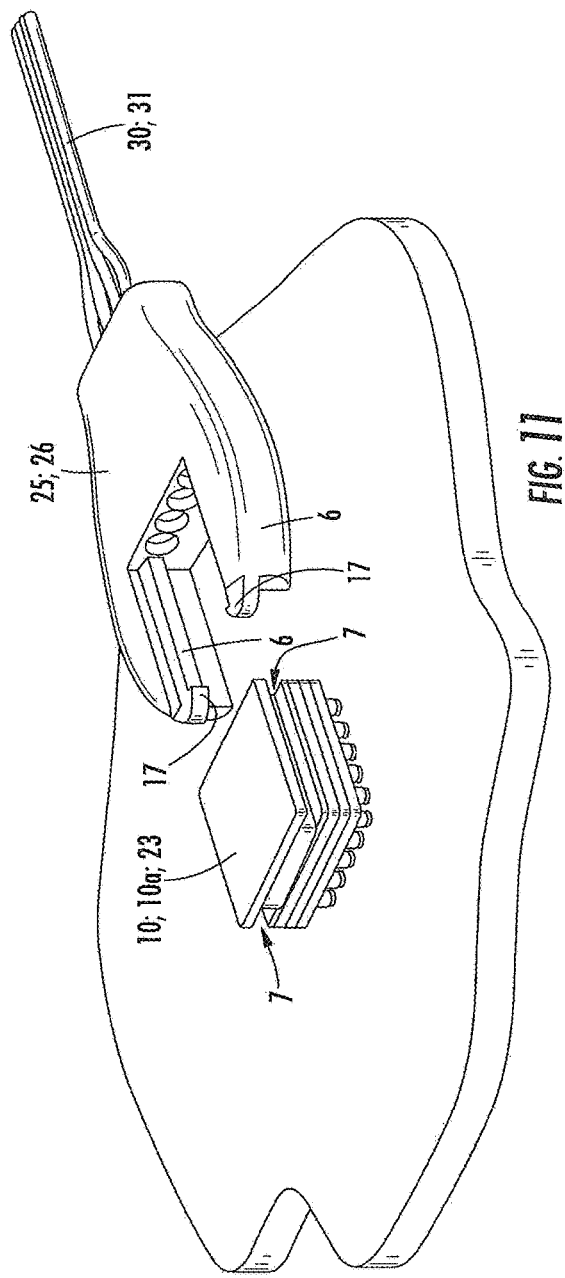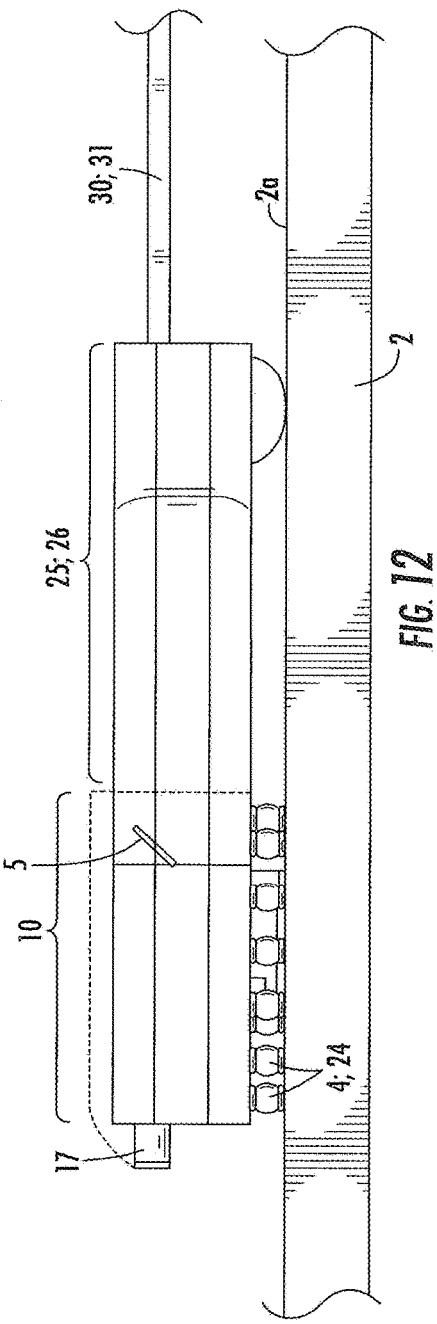

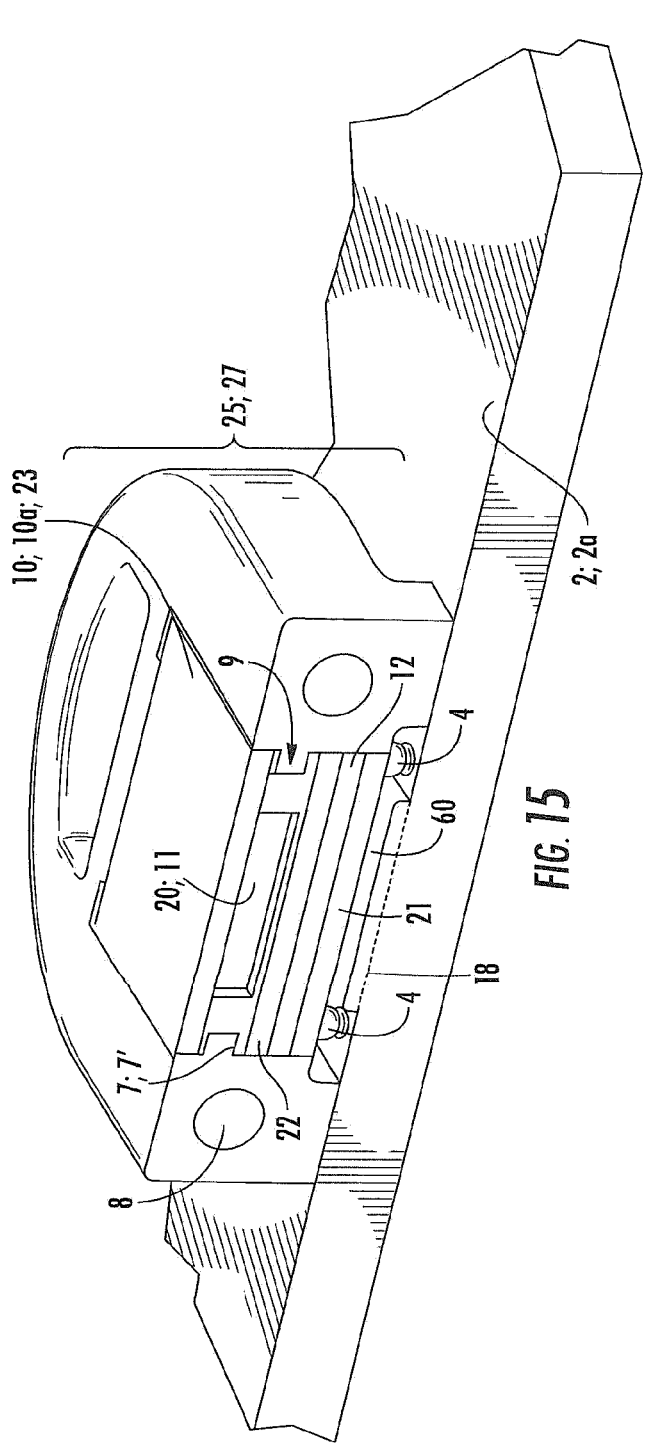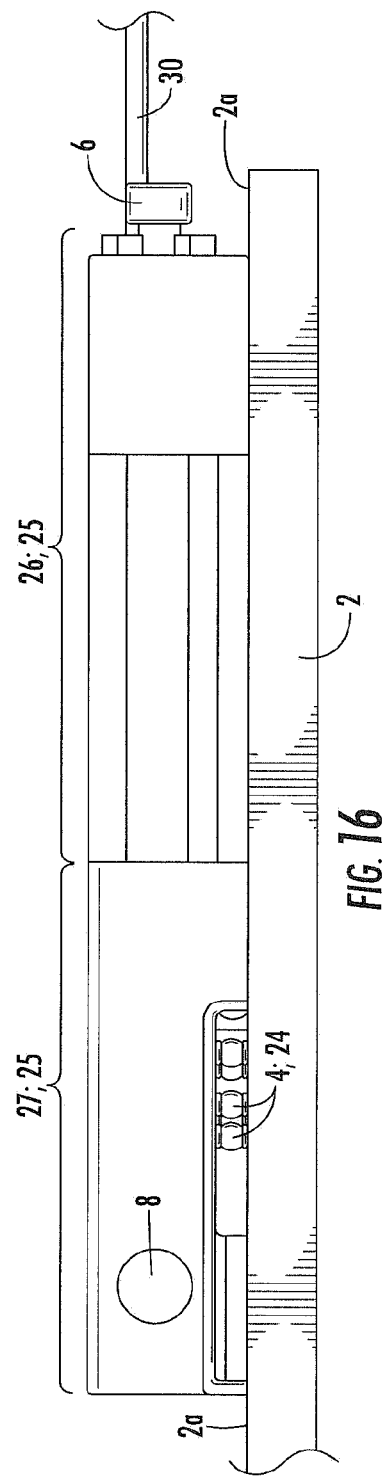
FIG. 15
FIG. 16

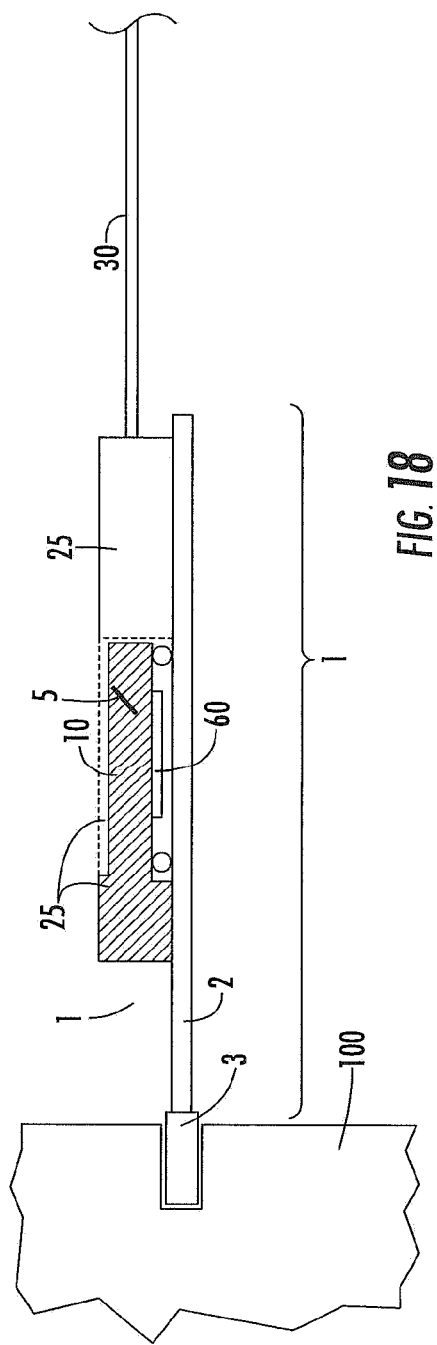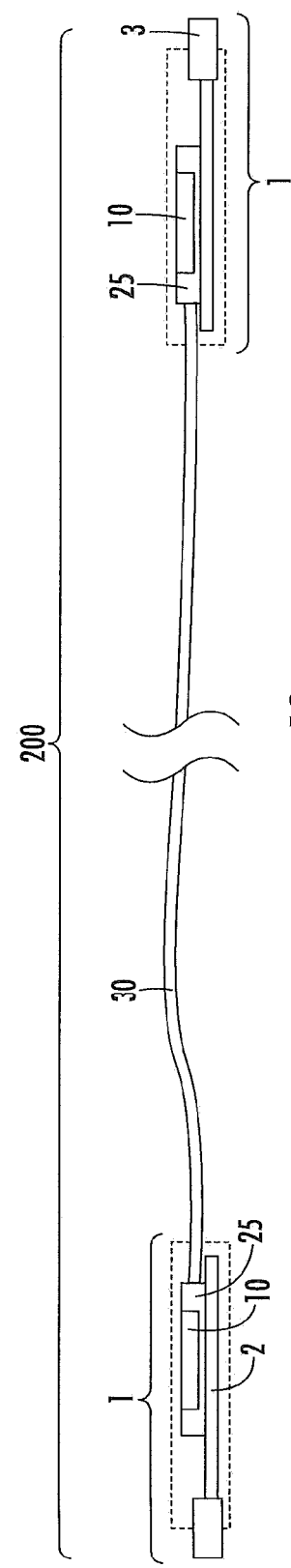

US 10,197,748 B2

CONNECTOR DEVICE FOR CONNECTING AT LEAST ONE OPTICAL FIBER END PIECE TO AN ELECTRIC TERMINAL

PRIORITY APPLICATIONS

This application is a continuation of International Application No. PCT/US16/19539, filed on Feb. 25, 2016, which claims the befit of priority to U.S. Application No. 62/128,632, filed on Mar. 5, 2015, both applications being incorporated herein by reference.

BACKGROUND

The application refers to a connector device for connecting at least one optical fiber to an electric terminal. Electric terminals of computers and further technical devices, such as USB port terminals, for instance, are connectable by cables for the purpose of data transmission. There are electric cables as well as optical cables usable for data transmission between separate devices. In particular, there are active optical cables comprising active optoelectronic elements, such as laser diodes, VCSELs, photo detectors, or photo diodes, etc. serving for active electrical-optical signal conversion, or vice-versa. For instance, there are Thunderbolt cables based on an underlying electrical-optical data transmission protocol.

These and other kinds of active optical cables have to be connected to the computers and other devices. For instance, there are USB-3 ports providing established standards for the geometry of the electric connector plugs at the ends of the active optical cables used. For instance, the USB-C connectors, that is USB type-C connectors provide a standard for future cable port design.

There are further conventional plug designs such as the so-called 'display port' or the 'mini display port' which, however, represent passive optical cables for monitors, rather than active optical cables.

An active optical cable may comprise one optical fiber or a plurality of optical fibers, for instance four optical fibers. For active optical cables, that is for cables actively converting electrical signals to optical signals or vice versa at the respective fiber end piece, there is the problem of how to effectively couple the optical fiber end piece to the active elements, such as laser diodes, VCSELs, photo detectors or photo diodes, etc. in order to ensure high coupling efficiency with minimum signal losses. Further, a mechanically robust design of the connector plugs of an optical fiber cable is an issue. In particular, properly connecting both fiber end pieces to the light emitting and/or light detecting optoelectronic elements for is still a critical issue since, since for ensuring minimum signal losses, it is vital that each of the two fiber end pieces of any optical fiber is coupled to a corresponding optoelectronic element in an individually aligned position and/or orientation. Proper alignment of each fiber end piece to the photo diodes, laser diodes or other kinds of optoelectronic elements is rendered even more challenging by the fact that, for reducing excessive plug height, a 90° optical turn is desired, especially when the optoelectronic elements are mounted or arranged in an orientation such that the propagation direction of radiation signals to be emitted and/or detected by is substantially normal to the main surface of the printed circuit board of the respective connector device.

For achieving the optical turn by about 90° and for providing a robust electrical-optical connection with minimum signal loss, there is still a need for an adequate construction of connector devices and of active optical cables comprising them.

SUMMARY

The present application provides a connector device and an active optical cable comprising at least one connector device.

In one embodiment, a connector device for connecting at least one optical fiber endpiece to an electric terminal is provided, wherein the connector device at least comprises a printed circuit board comprising electronic circuitry; an electric connector plug connectable to an electric terminal. The connector plug is mounted to the printed circuit board. A fiber end piece holder secures or is designed to secure at least one fiber end piece of at least one optical fiber in a position and/or orientation for enabling propagation of electromagnetic radiation in a propagation direction substantially parallel to a main surface of the printed circuit board. An optoelectronic chip comprises at least one optoelectronic active element capable of emitting and/or detecting electromagnetic radiation of a wavelength transmissible via the at least one optical fiber. Furthermore, at least one reflection surface is provided for changing the propagation direction of electromagnetic radiation between and the propagation direction substantially parallel to the main surface of the printed circuit board and a propagation direction substantially normal to the main surface of the printed circuit board.

The connector device further comprises a layered optical stack comprising a number of layers, the layered stack being designed for optically transmitting signals of electromagnetic radiation between at least one optical fiber end piece and the optoelectronic chip. The optoelectronic chip is mounted between the printed circuit board and the layered optical stack in an orientation enabling propagation of radiation in a propagation direction substantially normal to the main surface of the printed circuit board.

The at least one reflection surface is arranged inside the layered optical stack; thus at least one optical layer of the layered optical stack is designed to comprise the at least one reflection surface.

BRIEF DESCRIPTION OF THE DRAWINGS

Exemplary embodiments are discussed hereinbelow with reference to the figures.

FIGS. 4A and 4B show top perspective and bottom perspective exploded views of the layered optical stack of FIG. 3.

FIG. 5 shows a patterned layer according to a further embodiment.

FIG. 6 shows a cross-sectional view of the patterned layer of FIG. 5.

FIG. 7 shows a connector device with a first embodiment of a fiber end piece holder.

FIG. 8 shows a sectional view through the connector device of FIG. 7.

FIG. 9 shows a fiber end piece holder according to the first embodiment.

FIG. 10 shows the engagement members of the fiber end piece holder of FIG. 9.

FIG. 11 shows a connector device with a second embodiment of a fiber end piece holder.

FIG. 12 shows a cross-sectional side view of the connector device of FIG. 11.

FIG. 15 shows a cross-sectional view for illustrating the engagement of the second holding piece with the layered optical stack according to the embodiment of FIGS. 13 and 14.

FIG. 16 shows a side view of the connector device of FIGS. 13 to 15.

FIG. 18 shows a connector device forming one end of an active optical cable and being plugged in an electrical terminal.

FIG. 19 shows an active optical cable comprising two connector devices.

DETAILED DESCRIPTION

Figure 1:
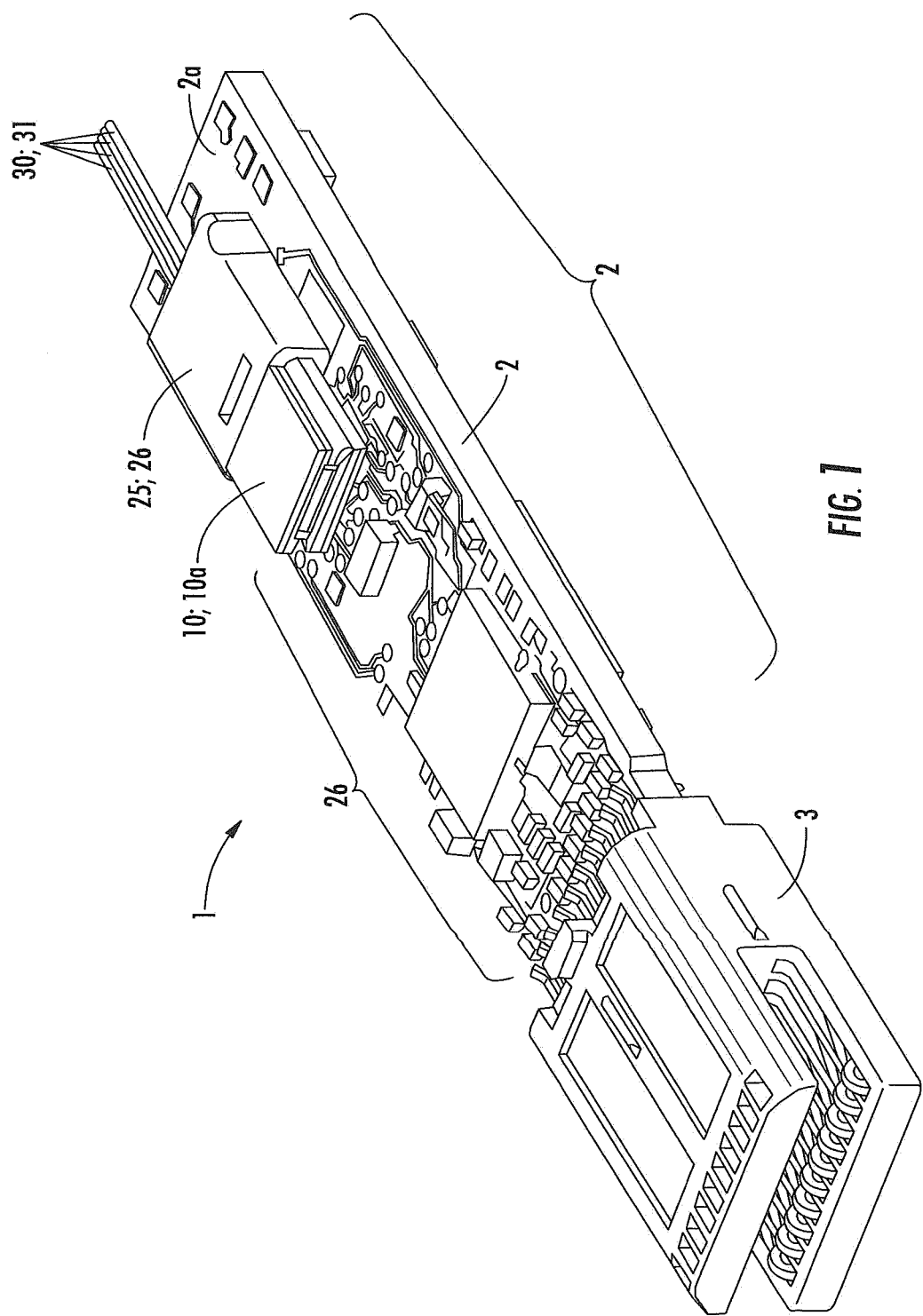
FIG. 1 shows a connector device operable at one end or both ends of a number of optical fibers, thus providing an active optical cable couplable to an electric terminal.

FIG. 1 shows a perspective view of an exemplary embodiment of a connector device 1 according to the present application. The connector device 1 may represent a stand-alone marketable product, or it may be provided at one or either end of at least one optical fiber so as to provide an active optical cable. The connector device 1 has a printed circuit board 2 comprising electronic circuitry and carrying or being carried by a connector plug, such as a USB-3 plug, particularly USB type-C plug, or a display port plug or mini display port plug, for instance, or any other kind of plug couplable to an electric terminal. The shape and construction of the connector plug 3 shown in FIG. 1 is not limited to any of these options.

The connector device 1 comprises an fiber end piece holder 25 or is at least is designed for optical coupling to a fiber end piece holder 25, for instance an integral, one-piece fiber end piece holder comprising only one holding piece 26 to which the fiber end pieces 31 of one or plural optical fibers 30 are mounted.

According to the present application, a connector device 1 is proposed which comprises a layered optical stack 10 comprising one or plural optical layers. The optical stack effects an optical turn of optical signals by an angle of about 90° and provides for mechanical coupling of the fiber end pieces and/or of the fiber end piece holder to the printed circuit board of the connector device. The layered optical stack, though being mechanically connected to the printed circuit board, is arranged at a distance from the main surface of the printed circuit board, and a fiber end piece holder is couplable to the layered optical stack, rather than directly to the printed circuit board.

Furthermore, whereas conventionally the optoelectronic elements for receiving and emitting optoelectronic elements, such as photo diodes and laser diodes, for instance, are mounted on the printed circuit board or form part of an optoelectronic chip mounted on the printed circuit board 2, according to embodiments of the present application the optoelectronic chip can be mounted to the layered optical stack and/or can be arranged between the printed circuit board and the layered optical stack. The layered optical stack per se provides for the desired optical turn, for reliable and high-efficient data transmission with minimum signal losses and, finally, for mechanically robust connection between the fiber end piece holder 25 and the printed circuit board 2. The fiber end piece holder 25 may be mounted to the layered optical stack 10, rather than to the optoelectronic chip or to the main surface 2a of the printed circuit board 2.

Figure 2:
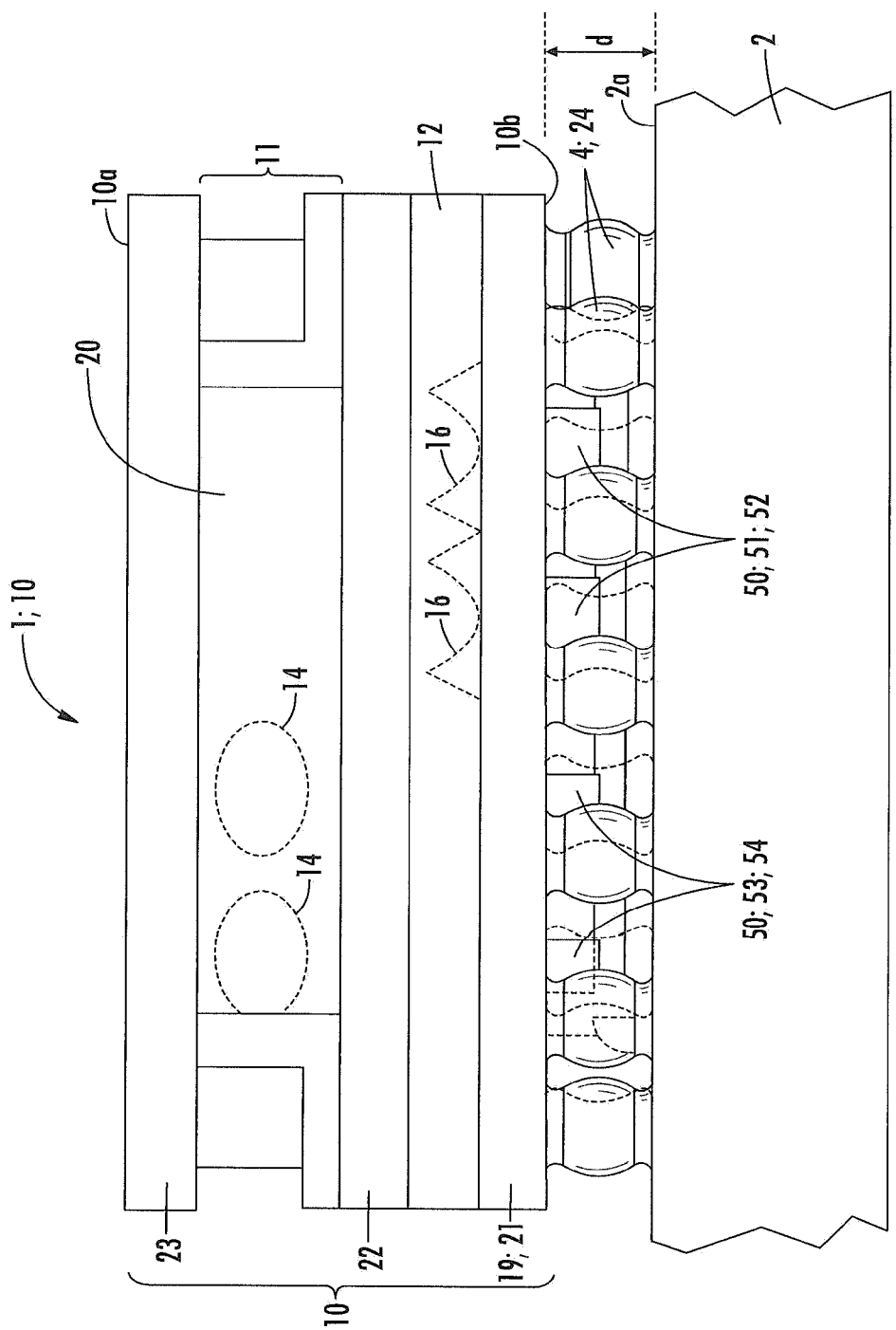
FIG. 2 shows a cross-sectional view of an exemplary embodiment of a layered optical stack comprised in the connector device.

FIG. 2 shows a first exemplary embodiment of a layered optical stack 10 of the connector device 1. The layered optical stack 10 comprises a number of layers; for instance at least two layers which comprising at least a first patterned layer 11 and a first non-patterned layer 21. The layered optical stack comprises a top side 10a and a bottom side 10b. The layered optical stack 10 is mounted at a distance d from the main surface 2a of the printed circuit board 2. An optoelectronic chip 60 underneath the layered optical stack 10 (compare FIG. 4A) comprises optoelectronic active elements 50, such as photo diodes 51 or other kinds of light detecting, that is receiving active elements 52, and/or laser diodes 53, VCSELs or other kinds of emitting active elements 54. The optoelectronic chip does not need to be mounted to the printed circuit board directly. Instead, as shown in FIG. 2 and more clearly visible in FIGS. 4A, 4B, 14 and 15, the optoelectronic chip may be mounted to the bottom side 10b of the layered optical stack 10 directly, thus being in perfect alignment to the optical stack and/or the fiber end piece holder. Electric connection to the optoelectronic chip 60 may be provided a plurality of electrical contacts 4, such as contacts of a ball grid array 24 as shown in FIG. 2 and the subsequent figures. The plurality of electrical contacts 4 are directly attached to the main surface 2a of the printed circuit board 2 and, by the way, to the bottom surface 10b of the optical stack 10, whereas the optical layered stack, the optoelectronic chip and/or the fiber end piece holder are supported by the plurality of electrical contacts 4, without being mechanically coupled to the main surface of the printed circuit board directly. The layered optical stack ensures high coupling efficiency, provides a robust anchor for docking of the fiber end piece holder, and moreover provides the optical turn between both propagation directions normal to and vertical to the main surface of the printed circuit board, that is substrate.

Whereas at least one patterned layer 11 is provided which comprises a reflection surface, such as a mirror surface for total internal reflection oriented at about 45° relative to the main surface of the substrate, at least one non-patterned layer 21 may be provided in the layered optical stack 10, for instance as its support layer 19 or bottom layer on whose bottom side or underside the plurality of contacts 4 is connected. Though not explicitly shown in FIG. 2, laterally extending conductor lines connect each of the electrical contacts 4 with the optoelectronic chip and/or optoelectronic active elements 50 to 54 arranged between them.

Whereas the optical stack comprises at least one patterned layer 11 and a further, non-patterned layer 21, the stack may comprise further layers, such as further patterned layers 12, 13 and/or further non-patterned layers 22, 23.

Wherever patterned layers are addressed in the application, they may be polymer layers, for instance, and may be patterned so as to comprise optical elements. In particular, the first patterned layer 11 comprises an inclined reflection surface 5. In FIG. 2, the reflection surface 5 is hidden by the entrance/exit surface 20 which is passed by the signals traveling between the reflection surface 5 and the fiber end pieces 31 or end surfaces of the optical fibers. The reflection surface 5 is more clearly illustrated in FIGS. 5, 8 and 17 and may, for instance, be an oblique sidewall of a recess which may be provided in the top surface of the first patterned layer 11. The oblique reflection surface 5 provides the optical turn by about 90° between the vertical propagation direction between the optoelectronic elements 50 and the reflection mirror 5, on the one hand, and the lateral propagation direction between the fiber end pieces 31 and the reflection surface 5, on the other hand. Accordingly, between the entrance and/or exit surface 20 and the oblique reflection surface 5, the signals travel horizontally inside the layered optical stack 10, that is parallel to the surfaces and intermediate surfaces of and between the layers of the optical stack, whereas between the oblique reflection surface 5 and the bottom surface 10b, the electromagnetic signals travel vertically, that is along the normal direction of the stack layers and of the printed circuit board 2, due to the direction of emission and/or receptivity of the optoelectronic elements 50 of the optoelectronic chip 60 underneath the layered optical stack 10.

As indicated in FIG. 2, the reflection surface 5 (which may be designed for total internal reflection) may optionally comprise a further optical surface region, such as lens surfaces (indicated elliptically in FIG. 2). Such optical surface regions may particularly be arranged in positions associated with light emitting elements 54 such as laser diodes 53. As a further optional embodiment not illustrated, instead of one single reflection surface 5 for light beams of all optical fibers, a plurality of reflection surfaces 5 may be provided, with each reflection surface 5 being dimensioned for reflection of light beams associated with one or some of the optical fibers.

Optionally, a second patterned layer 12 may be provided which may, for instance, comprise further, second optical surface regions 16, such as lens surfaces 16 at positions associated with detecting active elements 52, such as photo diodes 51, for instance. The first and second patterned layer may be arranged in direct contact with one another or, as illustrated in FIG. 2, may be separated by a second non-patterned layer 22. Alternatively, only one single (first) patterned layer 11 may be provided which comprises, in addition to the reflection surface 5, all optical surface regions 14 and 16. In FIG. 2, however, the second optical surface regions 16 are surface portions of the second patterned layer 12, and an optional intermediate patterned layer 22 is provided between both patterned layers 11, 12. Furthermore, as indicated in FIG. 2, another (third) patterned layer 23 may be provided, for instance as a top layer of the layered optical stack 10.

Wherever in this application a patterned layer 11; 12; 13 is addressed, it may, for instance, be a polymer layer. Wherever a non-patterned layer 21; 22; 23 is addressed in the application, it may, for instance, be a glass layer or a glass sheet. The term "non-patterned" means that, apart from the circumferential sidewalls of the stack, the non-patterned layers do not have any internal patterns such as indentations, through-holes, protrusions or other kinds of datums for mating alignment with further elements or components of the connector device and/or of the fiber end piece holder. Instead, the non-patterned layers may be provided to increase the robustness, mechanical stability and/or hardness of the layered optical stack 10. For instance, the non-patterned, lowermost support layer 19; 21 and/or the uppermost non-patterned layer 23 forming the top layer of the stack may serve, during panel level fabrication, to seal and protect the stack layers between them from being contaminated in the dicing/sawing procedure, for instance during laser cutting, i.e. laser dicing, or during mechanical sawing, i.e. mechanical dicing.

The patterned layers or at least one or some of them may comprise not only patterns such as the reflection surface 5 and any optional optical surface regions 14, 16, but may further comprise patterns at or close to the lateral sidewalls of the stack 10, thereby forming engagement members for mechanical engagement with further members of a fiber end piece holder 25 or a component of it, such as a holding piece 26; 27 thereof. A detailed discussion of the engagement members is provided further below.

The patterned and non-patterned layers are chosen appropriately with regard to their refractive index, and they are optically transmissive at least at the wavelength or wavelength range used for optical transmission via the fiber or fibers 30, which may be within the visible range of light or in the infrared range, for instance. The term 'optical' used in connected with the layered optical stack 10 or a layer thereof shall only denote that 'optical imaging or at least concentration or guidance of optical rays electromagnetic radiation is to be achieved by the particular orientation, shape and/or curvature of the patterned and/or non-patterned layers and/or their surfaces and intermediate surfaces.

Figure 3:
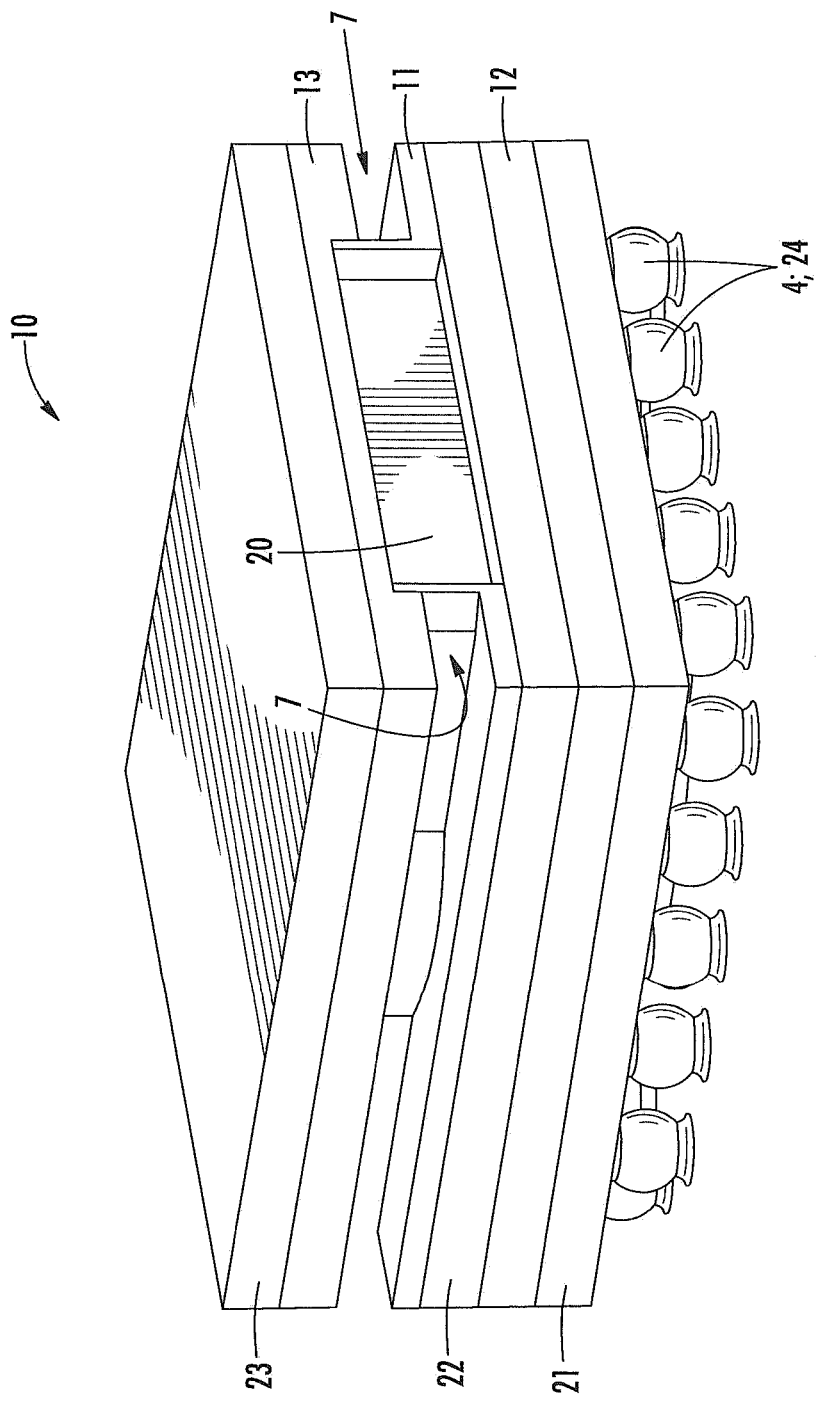
FIG. 3 shows a perspective view of another exemplary embodiment of a layered optical stack.

FIG. 3 shows a perspective view of another exemplary embodiment of a layered optical stack 10 quite similar to that of FIG. 2. In contrast, however, in FIG. 3 the first patterned layer 11 of FIG. 2 is subdivided into first and third patterned layers 11, 13 which may be provided directly on top of one another and, optionally, may engage with one another. The first patterned layer of FIG. 2 or the first and third patterned layers 11, 13 of FIG. 3 may comprise or combinedly form engagement members for mechanical engagement with first engagement members 6 (see further below) of a fiber end piece holder 25 or a holding piece 26, 27 thereof. The engagement members of the layered optical stack 10 thus form second engagement members 7 which, for instance, may extend along two opposite sidewalls of the optical stack 10. They may be provided at the same vertical position as the entrance/exit surface 20 and the internal reflection surface 5. However, alternatively, instead the second patterned layer 12 or any other patterned layer may comprise the second engagement members 7. In this application, the second engagement members 7 may particularly by indentations at which the sidewalls of the layered optical stack 10 are recessed in horizontal direction. This allows easy manufacturing of the layered stacks 10 on a large scale, since panel level production is applicable so as to first produce a panel or wafer of sufficient size for accommodating a matrix of plural layered optical stacks next to one another. Upon sawing or dicing it along predefined lines, such as laser dicing or mechanical dicing, for instance, plural individual layered optical stacks 10 are obtained which from the beginning not only provide the patterned structural elements 5, 14, 16, 20 on the inside but which also contain the laterally indented second engagement members 7 at their sidewalls. Accordingly, cost-effective panel level manufacture on a large scale with minimum costs is feasible.

FIGS. 4A and 4B show perspective exploded views of the layered stack 10 of FIG. 3. In the top perspective view of FIG. 4A, the arrangement of the optoelectronic chip 60 underneath the bottom surface 10b of the layered optical stack 10 is depicted, and the optoelectronic active elements 50 comprised in the optoelectronic chip 60 or, alternatively, connected to and/or contacted by the optoelectronic chip 60, is shown. Whereas in the application embodiments with two laser diodes 53 and two photo diodes 51 are shown, any other combination or selection thereof may be made. For instance, any number of light emitting active elements 54 and/or light detecting active elements 52 may be chosen instead. Inter alia, instead of bi-directional connector devices and active optical cables comprising them, likewise uni-directional devices with either at least one light detecting element 52 or at least one light emitting active element 54 may be provided.

In FIG. 4A, on top of the first patterned layer 11, a recess is shown with the oblique reflection surface 5 forming an oblique sidewall of the recess. The reflection surface 5 is associated with the entrance/exit surface 20. The second engagement members 7 may, for instance, be provided on two opposite sidewalls, that is on sidewalls on either side of the further sidewall which comprises the surface 20.

FIG. 4B shows a bottom perspective exploded view corresponding to FIGS. 3 and 4A. On the bottom surface of the second patterned layer 12, optional second optical surface regions 16 are shown which face the detecting active elements 52. In all embodiments of the application, the optoelectronic chip 60 may, for instance, be mounted to the bottom side 10a of the lowermost layer of the layered optical stack. Asp indicated in FIG. 15, between the chip 60 and the circuit board 2, a thermal pad 18 may be provided for cooling of the chip 60. Furthermore, although not shown in the figures of the application, between the chip 60 and the lowermost layer 21 of the stack 10, conductor lines extending laterally are provided for connecting the optoelectronic chip 60 with the electric contacts 4. The contacts 4 may, for instance, form a ball grid array 24. FIG. 4B also shows further engagement members for engagement of the first and second patterned layers 11, 13 with one another.

All layers of the optical stacks 10 shown in the figure of the application may adhere to one another by means of an appropriate adhesive (not shown) or, alternatively, may be simply laid on one another. However, provision of an adhesive between the layer of the stack 10 is possible, especially for alleviating large-scale production on panel level basis.

FIGS. 5 and 6 show another embodiment regarding the design of the first patterned layer 11 of the optical stack 10. In contrast to FIGS. 3 and 4A, 4B, no third patterned layer 13 is required. As the second engagement layers 7 for engagement with the first engagement members 6 of a fiber end piece holder 25 or a holding piece 26, 27 thereof, the first patterned layer 11 of FIGS. 5 and 6 provides lower first engagement layers 7' as well as upper second engagement members 7". Thus, the first engagement members 6 may engage and/or be guided between the upper and lower second engagement layers 7'; 7" on either opposite side surface of the first patterned layer 11. In contrast to FIG. 2, the upper second engagement members 7" per se prevent delamination of an upper top layer or third non-patterned layer 23 from the first patterned layer 11 even when mechanical tension or stress is inserted by the first engagement members of the fiber end piece holder 25 or a holding piece 26, 27 thereof.

The entrance/exit surface 20 of the first patterned layer 11 of FIGS. 5 and 6 faces the exit surfaces of the fiber end pieces 33, whereas the oblique reflection surface 5 visible in FIG. 5 turns the propagation direction between horizontal and vertical, that is between parallel to and normal to the surfaces or surface boundaries of the optical stack, which at the same time is parallel to and normal to the main surface 2a of the printed circuit board 2.

As shown in FIG. 6, the upper second engagement members 7" may have oblique portions to as to force the second engagement members 6 of the fiber end piece holder or its component downwards towards upper surfaces of the lower second engagement members 7', which thereby provide abutting surfaces for bottom surfaces of the first engagement members 6. Thereby, alignment is further improved.

FIG. 7 shows a perspective view of the connecor device having a first embodiment a fiber end piece holder 25 which comprises only one single holding piece 26. In the figures of the application, at least three embodiments regarding the internal construction of the layered optical stack 10 as well as three embodiments regarding the construction of the fiber end piece holder 25 are shown. It is to be noted that any of the three embodiments regarding, the construction of the layered optical stack may be combined with any of the three embodiments regarding the construction of the fiber end piece holder 25. Thus the figures merely show exemplary combinations for the sake of illustration.

In FIG. 7, the holding piece 26 of the fiber end piece holder 25 comprises two first engagement members 6, such as prongs, teeth, pins or other kinds of protrusions which may engage with the second engagement members 7 of the layered optical stack 10. The second engagement members 2a may provided in the first patterned layer 11. Instead, however, they may be provided in any other layer of the stack. In the particular example of FIG. 7, the prongs 7 are L-shaped in cross-section and have a longitudinal direction extending horizontally so as to be guided by and to engage with the second engagement members 7, in particular they are slidably insertable between the lower and upper second engagement members 7', 7". Thereby, the end surfaces of the fiber end pieces 31 (or, alternatively, lenses optionally provided ahead of them inside the fiber end piece holder 25) may approach the entrance/exit surface 20 of the layered optical stack 10 in properly aligned positions for efficient optical coupling to the active elements 50 via the inclined reflection mirror 5. The fiber end piece holder 25 of FIG. 7 is a one-piece, integral part serving as a holding piece 26 which also carries the first engagement members 6. The fiber end piece holder 25 is thus mountable mechanically to the layered optical stack 10, rather than to the printed circuit board 2 or to its main surface 2a.

FIG. 8 shows a perspective cross-sectional view through the assembled arrangement of the layered optical stack 10 and the fiber end piece holder 25 shown in FIG. 7. The first engagement members 6 have been inserted between the lower and upper engagement members 7', 7" of the first patterned layer 11, which are arranged below and above the drawing plane of FIG. 8. Furthermore, a top view on the inclined reflection surface 5 is shown. Here, optional first optical surface regions 14 may be provided in the reflection surface 5, for instance in association with light emitting active elements 54. In additional array of lenses 15 or lens surfaces at or inside the holding piece 26, that is the fiber end piece holder 25, may additionally be provided in front of the fiber end piece surfaces. In the example of FIG. 8, four fiber end pieces of four optical fibers 30 are mounted inside the fiber end piece holder 25.

FIG. 9 shows a perspective view of the fiber end piece holder of FIGS. 7 and 8. As shown here, the fiber end piece holder is a monoblock holding piece 26. Furthermore, curved gliding surfaces of the first engagement members 6 are shown for releasable side-locking with the indentations and/or engagement members 7 of the layered optical stack 10 and/or or its first patterned layer 11. Thereby, alignment even along the longitudinal, that is horizontal direction of the optical fiber end pieces is obtained. Furthermore, the curved gliding or sliding surfaces (i.e. the flanges of both first engagement members 6, which flanges face each other) represent a latch-curve which is positioned such as to prevent complete snapping or locking at one particular position of engagement when the first engagement members 6 are about to be slidably engaged with the second engagement members 7. This alleviates removal of the stack 10 and the fiber end piece holder 25 from one another.

FIG. 10 shows an exemplary internal construction of the first engagement members 6 of the fiber end piece holder 25 of FIG. 9. According to FIG. 10, two first engagement members 6; 6A, 6B may be internally connected to one another on the inside of the fiber end piece holder 25 or a holding piece 26 thereof so as to form one singly, two-armed first engagement members 6, thereby ensuring a constant and precise relative position between both arms 6A, 6B or partial engagement members thereof. The entire two-armed first engagement members 6 may for instance be a stamped latch element. It may comprise mold flow openings with clearance to allow overmold geometry for insert molding. Thus an integral ferrule or connector, that is a one-piece fiber end piece holder is obtained.

FIG. 11 shows a second embodiment regarding the design of the fiber end piece holder 25. In FIG. 11, its holding piece 26 comprises two first engagement members 6 of a different design, with two distal protrusions 17 facing each other and being provided at the end of either first engagement member 6. Again, the first engagement members 6 engage with lateral indentations, here with second engagement members 7, on two opposite sidewalls of the layered optical stack 10, for instance at the height of the first patterned layer 11. Here, slipping out of the fiber end piece holder 25 off of the layered optical stack 10 in its longitudinal direction is prevented by the distal protrusions 17, rather than by the undulating shape of the sliding surfaces or flanges of the first and/or second engagement members 6; 7 in FIGS. 3 to 10.

FIG. 12 shows a side view of the connector device with the fiber end piece holder 25 of FIG. 11. Here, the position of the reflection mirror 5 inside the layered optical stack 10 is indicated. In locked position, the distal protrusions 17 of the fiber end piece holder 25 and/or of its holding piece 26 are embracing the layered optical stack 10 from behind, that is from the opposite, distal sidewall of the stack 10. On the main surface 2a of the printed circuit board, the fiber end piece holder 25 is only loosely supported in a slidable manner so as to be pullable off of the layered optical stack 10 later, if desired. The fiber end piece holder 25 and/or of its holding piece 26 may comprise a molded body.

Figure 13:
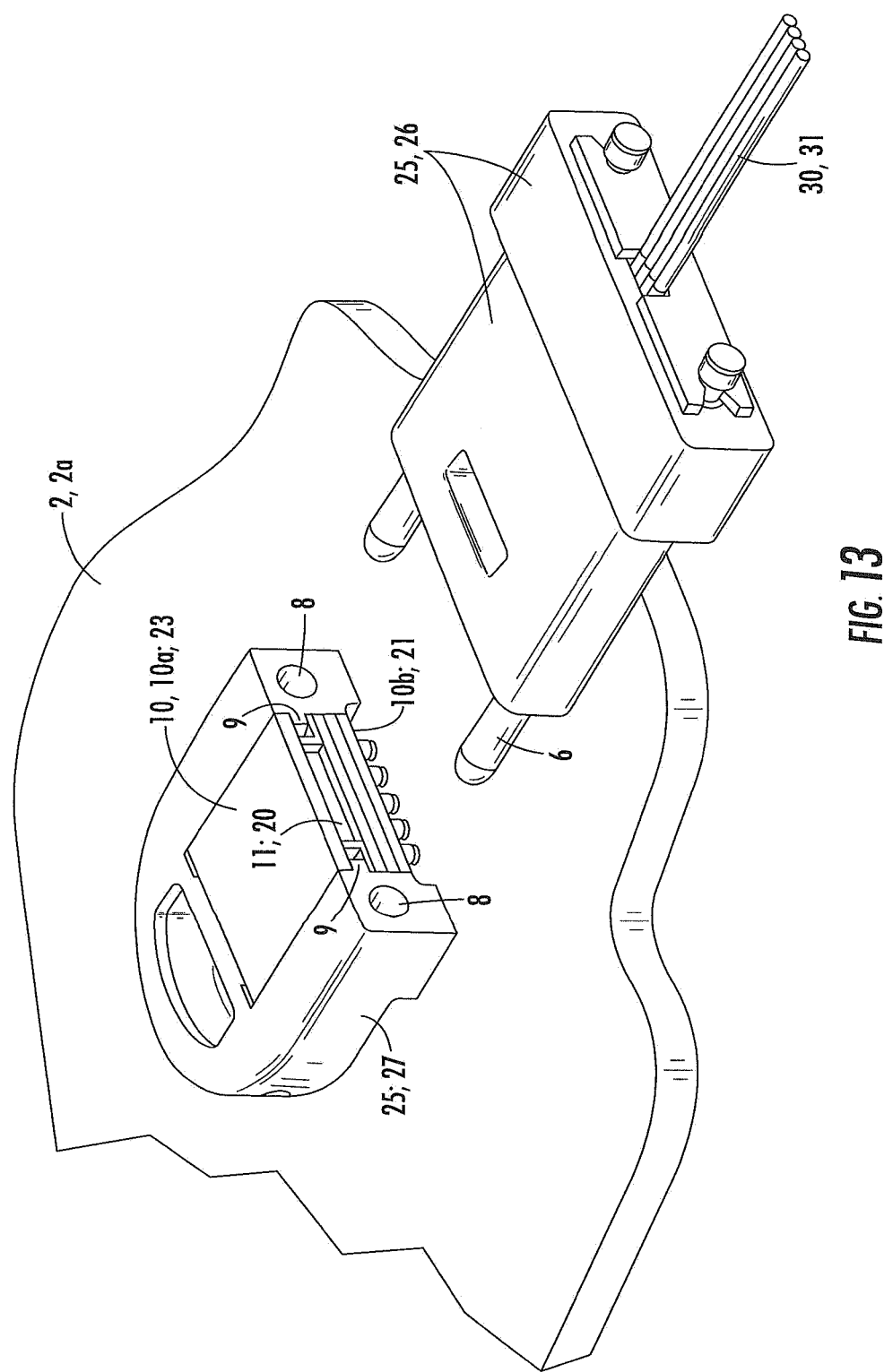
FIG. 13 shows a third embodiment of the connector device having a fiber end piece holder which comprises a first holding piece and a second holding piece.

FIG. 13 shows a third embodiment regarding the construction of the fiber end piece holder 25. In FIGS. 13 to 17, the fiber end piece holder 25 is subdivided into two holding pieces, that is into a first holding piece 26 directly connected to the fiber end pieces 31 and a second holding piece 27 for mechanical coupling to the layered optical stack and/or to the printed circuit board 2. In FIGS. 13 to 17, both holding pieces 26, 27 engage with one another, whereas the second holding piece 27 engages with the layered optical stack 10 and/or with the printed circuit board 2. Also in FIG. 13, the first holding piece 26 comprises pins representing the first engagement members 6. However, they engage with or are destined to engage with third engagement members 8 of the second holding piece 27 which has first been engaged with and/or mounted to the layered optical stack 10.

The second holding piece 27 further comprises fourth engagement members 9 for engagement with the second engagement members 7 of the layered optical stack 10 and/or of its first patterned layer 11. The third engagement members 8 of the second holding piece 27, however, are destined for engagement with the first engagement members 6 of the first holding piece 26 of the fiber end piece holder 25. Accordingly, in the embodiment of FIGS. 13 to 17, the first and second engagement members 6, 7 are not destined for direct engagement with one another. Instead, they only indirectly engage with one another via the second holding piece 27 coupled between them.

Whereas in the present application, the part or component 27 is called the second holding piece 27 of the fiber end piece holder 25, it is to be noted that the particular naming is not to be regarded as a constructional limitation. Likewise, the part 27 may be called, regarded and/or function as a 'layered optical stack holder', as a 'stack bracelet', as a 'stack mount' or 'stack holder' for mounting or at least additionally affixing the layered optical stack to the printed circuit board 2 or to its main surface 2a. Accordingly, the stack, in particular its sidewall comprising the entrance/exit surface 20, and/or the component part 27 may combinedly form a counterpart piece to which the fiber end piece holder 25 or its holding piece 26 is coupled to or couplable to.

In the particular design of FIG. 13, the component part 27 is shaped similarly to a horseshoe when seen from above in top view. Generally, it may, for instance, embrace or surround two, or even three, sidewalls of the layered optical stack. The fourth engagement members 9 of the stack 10 may be lateral protrusions protruding horizontally in the second engagement members 7 of the layered optical stack 10. They may be inserted slidably into them horizontally. Additionally, the part 27 may be attached and secured to the printed circuit board 2 or its main surface 2a (not shown).

The part 27 provides mechanical protection of the layered optical stack from tensional forces, angular momentums or other mechanical influences, which could possibly be exerted by the optical fibers via the fiber end piece holder 25 or its first holding piece 26 onto the layered optical stack. The second holding piece 27 thus offloads such forces away from the optical stack, thereby preventing it from being prone to delamination of one or some of its layers, since the mating forces do no longer act on the stack itself. For instance, the second non-patterned layer 23 forming the top surface of the optical layered stack 10 is protected from being torn off or delaminated, which otherwise might happen, in the absence of the second holding piece 27, when the first holding piece 26 is dragged in vertical direction and/or tilted or moved otherwise so as to exert tensional forces onto the stack and/or other components of the connector device 1.

Figure 14:
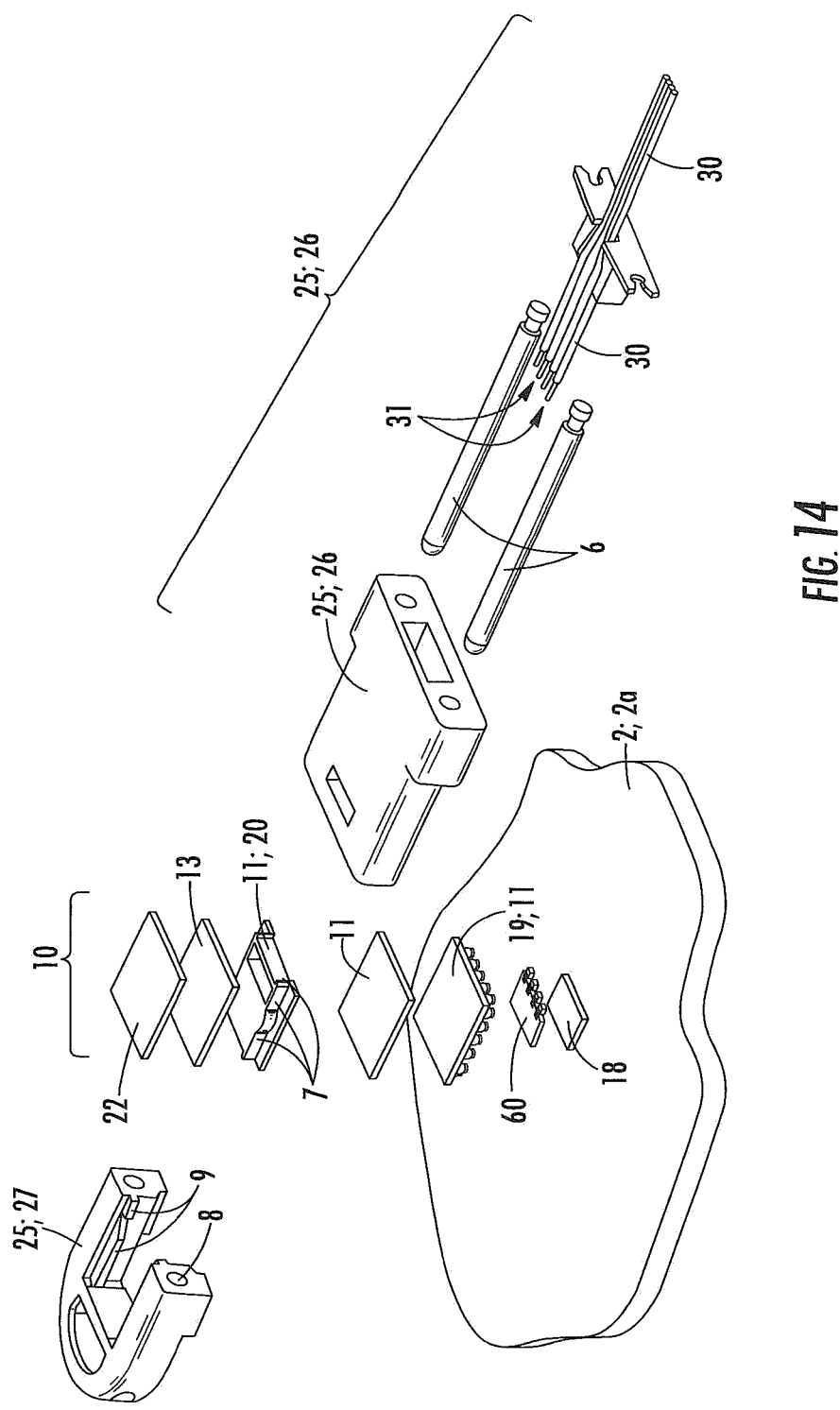
FIG. 14 shows an exploded view of the connector device shown in FIG. 13.

FIG. 14 shows a perspective exploded view of FIG. 13 in which the individual constructional parts, except for the connector plug 3 and the detailed shape and circuitry of the printed circuit board 2 are shown. Thus, with regard to the individual parts and components of the connector device explicitly shown in FIG. 14, the explanations given above with reference to FIGS. 1 to 13 as well as with regard to the subsequent figures are referred to, in particular with regard to the detailed constructional designs of the layered optical stack 10. As further apparent from FIG. 14, beneath the optoelectronic chip 60, a heat conduction plate 18 may be provided for conducting heat, which is generated by the optoelectronic chip 60, downward towards the main surface 2a of the printed circuit board 2. As shown, the fourth engagement members 9 of the second holding piece 27 may be patterned in their longitudinal direction so as to lock with corresponding regions of the second engagement members 7 of the layered optical stack. Furthermore, vertically downward protrusions of the second holding piece 27 may be provided for abutting on the main surface 2a of the printed circuit board 2. Finally, the internal design of the first holding piece 26, that is of the actual fiber end piece holder 25 in the actual sense of this word, is shown. Whereas in the figures of the present application and in particular in FIGS. 13 to 17, the first engagement members are shown to be protrusions, such as pins 6 (see FIG. 14), it is to be stressed that, instead, indentations or recesses can also represent the first engagement members. For instance, the first (rather than the second) engagement members 6 might be protrusions which laterally protrude in the second engagement members 7 of the fiber end piece holder 25. Further, alternatively, one of the first engagement members 6 may be a protrusion, whereas the other one may be a recess or indentation. The same then vice versa applies likewise to the first engagement members. Thus, the first engagement members may comprise one concave and one convex engagement member for engagement with one convex and one concave respective second engagement member 2 of the second holding piece. Analogous variations regarding protruding or indented engagement members apply to the second and third engagement members 6, 8 between the first and second holding pieces 26, 27 in FIGS. 13 to 17 and/or to the direct engagement of the first and second engagement members 6, 7 shown in FIGS. 1 to 12.

In the particular design of FIG. 14, both first engagement members 6 of the first holding piece 26 are formed as protrusions, such as pins, prongs or teeth; they may extend through the first holding piece 26, and the fiber end pieces 31 including their end faces facing the entrance/exit surface 20 of the layered optical stack 10 may be arranged between both of the two first engagement members 6.

FIG. 15 shows a cross-sectional view through the connector device 1 of the third embodiment comprising the two holding pieces 26, 27. In the sectional perspective view, at least two protrusions of the second holding piece 27 extending downward to the main surface 2a of the printed circuit board are shown; as well as an elevated portion of the main surface 2a optionally provided and acting as a heat conduction plate 18 underneath the optoelectronic chip 60 for cooling it.

The third engagement members 8 for engaging with the first engagement members 6 of the first holding piece 26 may be holes or protrusions (such as pins, prongs, teeth, etc.), or one of the two third engagement members 8 may be a protrusion, whereas the other one of them may be an indentation. For the fourth engagement members 9 to be engaged with the second engagement members 7 comprised in the stack 10, however, the fourth engagement members 9 may be protrusions, in particular lateral protrusions, so as to fill or at least partially fill the recesses or indentations in the two or three sidewalls of the layer stack. In FIG. 15, an exemplary design of the second holding piece 27 shaped in the form of a horseshoe is shown, without any limitation of the actual design being intended.

FIG. 16 shows a side view corresponding of the connector device 1 of FIGS. 13 to 15, in which side view both holding pieces 26, 27 of the connector device 1 are mounted to one another. The first engagement members 6 are filling or at least partially filling the third engagement members 8, or vice versa. Whereas the second holding pieces 27 may be connected to, mounted to and/or simply abut the main surface 2a of the printed circuit board directly, for instance by means of three vertically downward extending protrusions of the second holding piece 27, the first holding piece 26 is only slidably supported by the main surface 2a of the printed circuit board. During the process of engaging both holding pieces 26, 27 with one another or disengaging them, the engagement of the first and third engagement members with one another provides a pre-alignment even before a locking connection between them is completed.

Figure 17:
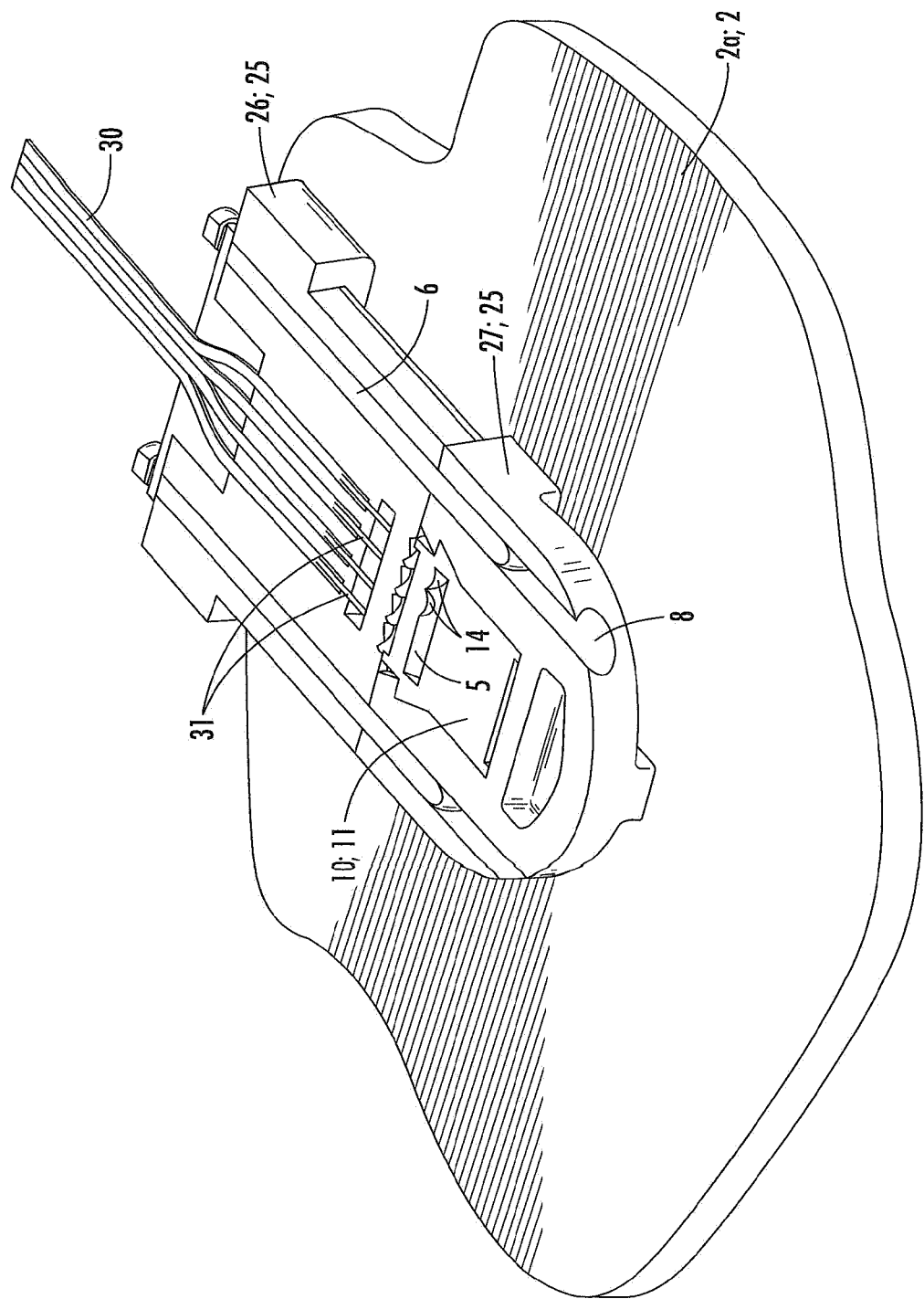
FIG. 17 shows a sectional view through the connector device of FIGS. 13 to 16.

FIG. 17 shows a perspective sectional view of the embodiment shown in FIGS. 13 to 16. In FIG. 17, the interlocking engagement between the first and third engagement members 6, 8 is shown. Furthermore, the alignment of the fiber end pieces 31 relative to the reflection mirror 5 is shown. Any beam of light or radiation exiting the end surfaces of the fiber end pieces 31 will leave the first holding piece 26 to as to enter the layered optical stack 10, through its entrance/exit surface 20, so as to be totally internally reflected by the oblique reflection surface 5. Reflection may occur in optical surface regions, such as in curved optical surface regions 14 comprised in the reflection surface 5 so as to additionally concentrate, focus or even image the beam of radiation when reaching the corresponding optoelectronic element 50 of the chip 60 which is mounted underneath or at least arranged underneath the layered optical stack 10 of optically transmitted layers. The reflection mirror 5 and/or the optional optical surface regions 14, 16, 20 at and/or inside the layered stack 10 qualify the stack as a micro-optical stack, that is a stack comprising micro-optical elements having dimensions in the sub-millimeter range. For instance, the stack may have a total height of only 1.5 millimeters.

The region of the reflection surface 5 where the respective light beam is reflected may be thus curved or, alternatively, may simply be planar, such as is the case of two further beams of light in FIG. 17, namely for those to be emitted by two emitting optoelectronic active elements 54 in order to enter the two left fiber end pieces of the four fiber end pieces 31 shown in FIG. 17.

FIG. 18 shows a schematic view of the connector device 1 coupled to an electric terminal 100 such as a USB port. The connector device 1 comprises a layered optical stack 10 mounted to a printed circuit board 2, either directly or indirectly, that is via a fiber end piece holder 25 or at least a holding piece 27 of the connector device 1. By means of connector device 1, at least one optical fiber 30 is connected to the electric terminal 100. A plurality of, for instance, four optical fibers 30 is connected, but any suitable number of optical fibers is possible according to the concepts.

FIG. 19 shows that a connector device 1 of the present application may form a part of an active optical cable 200. Accordingly, an active optical cable 200 is provided which comprises the connector device 1 at one or either end of its optical fiber or fibers. Accordingly, the active optical cable may comprise two connector devices 1 at the opposite fiber end pieces.

Figure 20:
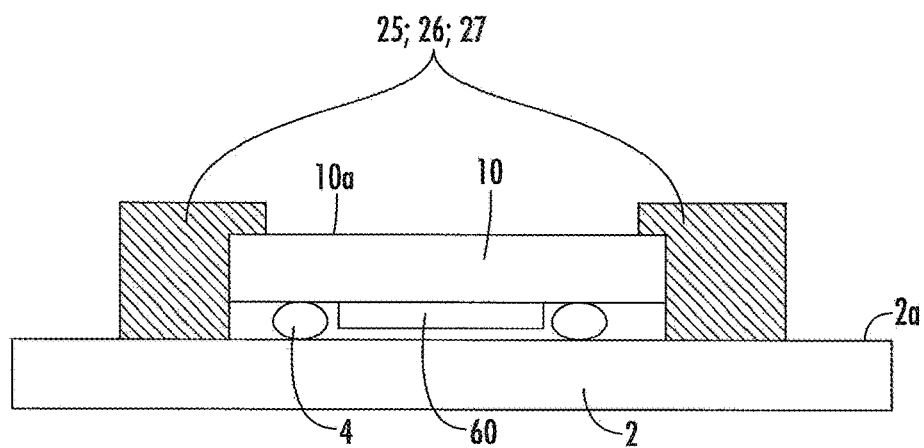
FIGS. 20 to 22 show embodiments regarding the geometry of engagement members, which embodiments are combinable with any one of FIGS. 1 to 19.
Figure 21:
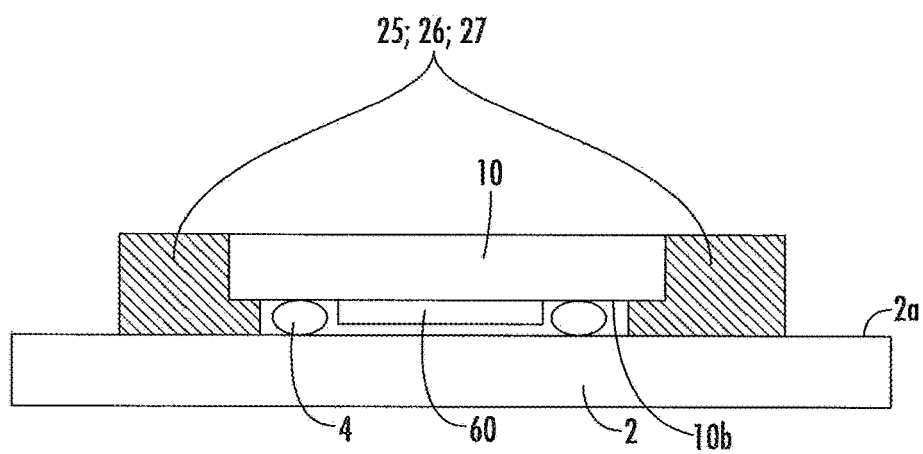
Figure 22:
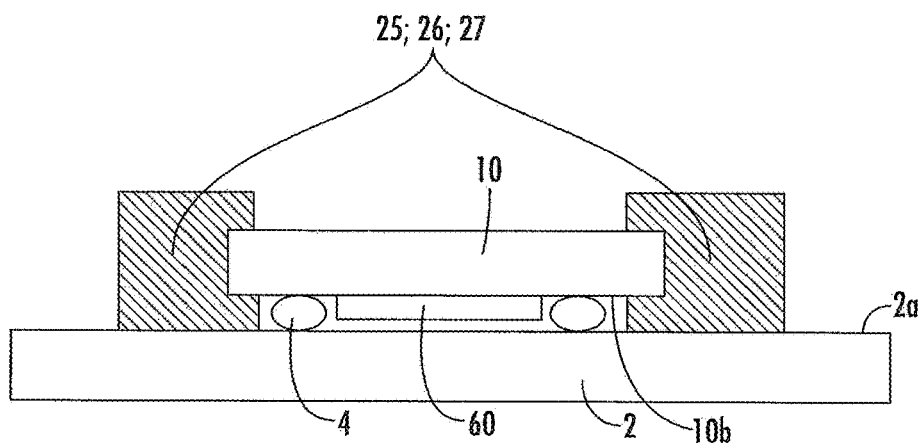

FIGS. 20 to 22 show alternatively varied embodiments regarding the cross-sectional geometry of engagement between the layered optical stack with the fiber end piece holder 25 or with a holding piece 26; 27 of the connector device 1. Whereas in FIGS. 1 to 17, second engagement members were formed in the sidewalls of the layered optical stack, it is to be noted that the optical stack provided according to the present application does not necessarily need to have such engagement members or indentations. Instead, it may suffice that the first and/or second holding piece 26; 27 or the fiber end piece holder 25 may engage with the top surface 10a and/or with the bottom surface 10b of the layered optical stack 10, such as at or near two opposite sidewalls of the optical stack. Accordingly, the sidewalls of the optical stack 10 need not have any indentations or engagement members; instead, regions of the top and/or bottom surfaces of the optical stack may serve as abutting surfaces for the corresponding engagement members 6; 9 of the fiber end piece holder 25 or holding piece 26; 27.

At least by the plurality of electrical contacts 4, the optical stack 10 is connected to the main surface 2a of the printed circuit board. The two hatched areas of the fiber end piece holder or holding piece 26; 27 shown in any of the FIGS. 20 to 22 may represent two opposed engagement members, or two regions of one and the same engagement member.

Any transceiver chip comprising optoelectronic elements may be coupled to optical fibers via an optical stack employed for the connector device 1 proposed in this application. The layers of the optical stack, such as polymer layers, glass sheets or others, may be laminated onto one another. The vertical dimensions of the layered optical stack are variable. As an exemplary embodiment, a top glass sheet serving as the third non-patterned layer 23 may have a thickness of 0.2 mm, the first or combined first and third patterned layer 11 or 11; 13 may have a thickness of 0.4 mm, and the intermediate second non-patterned layer may have a thickness of 0.2 mm. The second patterned layer 12 as well as the first, lowermost non-patterned layer 21 may each have a thickness of 0.2 mm. The top and bottom layers may be glass sheets or glass plates for mechanical protection and stability, especially for protection during embossing, cutting or dicing of the individual stacks out of a wider layered panel. The electrical contacts, such as ball grid array contacts, may have a height or at least cause a distance between the main surface 2a of the printed circuit board 2 and the bottom surface 10b of the layered optical stack of between 0.1 and 0.6 mm, especially between 200 and 400 mm, such as particular 0.3 mm for instance.

The engagement members 7 comprised in the layered stack represent buried alignment features or alignment members which become accessible after sawing or dicing of the panel into a plurality of stacks 10. Also the buried input/output surface, i.e. entrance/exit surface 20 becomes accessible only after sawing and patterning of the integrated TIR reflection surfaces are completed. Thus cost-effective large-scale production is applicable.

What is claimed is:

1. A connector device for connecting at least one optical fiber endpiece to an electric terminal, wherein the connector device at least comprises:
    a printed circuit board comprising electronic circuitry;
    an electric connector plug for connecting to an electric terminal, the connector plug being mounted to the printed circuit board;
    a fiber end piece holder securing or being designed to secure at least one fiber end piece of at least one optical fiber in a position and/or orientation for enabling propagation of electromagnetic radiation in a propagation direction substantially parallel to a main surface of the printed circuit board;
    an optoelectronic chip comprising at least one optoelectronic active element capable of emitting and/or detecting electromagnetic radiation transmissible via the at least one optical fiber; and
    at least one reflection surface for changing a propagation direction of electromagnetic radiation between a propagation direction substantially normal to the main surface of the printed circuit board and a propagation direction substantially parallel to the main surface of the printed circuit board;
    wherein the connector device further comprises a layered optical stack comprising a plurality of layers arranged in a stacked configuration such that a first layer of the plurality of layers is stacked on top of a second layer of the plurality of layers in a direction normal to the main surface of the printed circuit board, the layered stack being designed for optically transmitting signals of electromagnetic radiation between the at least one optical fiber end piece and the optoelectronic chip through the first layer and the second layer;
    wherein the optoelectronic chip is mounted between the printed circuit board and the layered optical stack in an orientation enabling propagation of radiation in a propagation direction substantially normal to the main surface of the printed circuit board; and
    wherein the at least one reflection surface is arranged inside the layered optical stack, at least one optical layer of the layered optical stack being designed so as to comprise the at least one reflection surface.

2. The connector device of claim 1, wherein the layered optical stack is provided at a distance from the printed circuit board and/or from the main surface of the printed circuit board.

3. The connector device of claim 1, wherein the layered optical stack is mounted to the main surface of the printed circuit board by means of a plurality of electrical contacts.

4. The connector device of claim 3, wherein the optoelectronic chip is mounted to a bottom side of the layered optical stack and is electrically connected to the printed circuit board via the plurality of electrical contacts supporting the layered optical stack.

5. The connector device of claim 3, wherein the plurality of electrical contacts are a ball grid array.

6. The connector device of claim 1, wherein the at least one active element faces a bottom side of the layered optical stack so as to enable signal transmission in a propagation direction normal to the main surface of the printed circuit board and/or normal to the layers of the layered optical stack.

7. The connector device of claim 1, wherein the first layer or the second layer of the layered optical stack at least comprises a first patterned layer designed so as to comprise the at least one reflection surface and further comprises a support layer.

8. The connector device of claim 7, wherein the support layer is supported by the plurality of electrical contacts contacting the optoelectronic chip.

9. The connector device of claim 7, wherein the first patterned layer is a layer made of plastic.

10. The connector device of claim 7, wherein the support layer is a layer of glass.

11. The connector device of claim 7, wherein the reflection surface is formed by a surface portion of the first patterned layer, the surface portion being oriented and/or designed so as to change the propagation direction between normal to the main surface of the printed circuit board and parallel to the main surface of the printed circuit board.

12. The connector device of claim 1, wherein the reflection surface inside the layered optical stack is a reflection surface for total internal reflection which is oriented at an overall inclination angle of between 40° and 50° relative to the main surface of the printed circuit board.

13. The connector device of claim 7, wherein the reflection surface is a recessed surface portion of a top surface of the first patterned layer, the top surface around the reflection surface facing away from the printed circuit board.

14. The connector device of claim 1, wherein the fiber end piece holder comprises at least one holding piece mechanically connected to the layered optical stack and/or to the printed circuit board.

15. The connector device of claim 1, wherein the fiber end piece holder at least comprises a first holding piece mechanically secured or securable to the layered optical stack and/or to the printed circuit board.

16. The connector device of claim 15, wherein the first holding piece comprises at least one first engagement member for mechanically securing the first holding piece.

17. The connector device of claim 16, wherein the at least one first engagement member of the first holding piece comprises a prong, a tooth, a pin or another kind of protruding member, and/or an indentation in the first holding piece.

18. The connector device of claim 1, wherein the fiber end piece holder comprises a first holding piece and a second holding piece, wherein the first holding piece is mechanically secured or securable to the layered optical stack, to the printed circuit board and/or to the second holding piece and is optically coupled or couplable to the optoelectronic chip via the layered optical stack.

19. The connector device of claim 1, wherein the fiber end piece holder and/or its second holding piece is mounted to the layered optical stack and/or to the printed circuit board.

20. The connector device of claim 18, wherein the fiber end piece holder and/or its second holding piece is mounted to the printed circuit board and is engaging with the layered optical stack so as to prevent the layered optical stack from being delaminated, split or torn off.

21. The connector device of claim 1, wherein the fiber end piece holder or a holding piece thereof embraces the layered optical stack on its top side and/or its bottom side at at least two edges of the layered optical stack so as to prevent the layered optical stack from being delaminated, split or torn off.

22. The connector device of claim 1, wherein the fiber end piece holder and/or or its second holding piece mechanically engages with the layered optical stack at at least one side surface of the layered optical stack.

23. The connector device of claim 1, wherein the fiber end piece holder and/or its second holding piece laterally surrounds the layered optical stack at two, three or four side surfaces thereof.

24. The connector device of claim 16, wherein the first layer or the second layer of the layered optical stack comprises second engagement members for engaging with engagement members of the fiber end piece holder or for engaging with engagement members of a holding piece of the fiber end piece holder.

25. The connector device of claim 1, wherein the fiber end piece holder and/or a first holding piece thereof comprises first engagement members and wherein the first layer or the second layer of the layered optical stack comprises second engagement members for mechanical engagement with the first engagement members.

26. The connector device of claim 25, wherein the second engagement members are recesses in at least one side surface of the first layer or the second layer of the layered optical stack and wherein the first engagement members are prongs, teeth, pins or other kinds of protrusions for engagement with the recesses.

27. The connector device of claim 18, wherein the second holding piece comprises third and fourth engagement members, wherein the third engagement members are engaged or engageable with the first engagement members of the first holding piece, whereas the fourth engagement members are engaged or engageable with the second engagement members of the layered optical stack.

28. The connector device of claim 27, wherein the second engagement members are recesses in at least one side surface of the first layer or the second layer of the layered optical stack and wherein the third engagement members of the second holding piece are engaged or engageable with the recesses.

29. The connector device of claim 27, wherein the second holding piece comprises at least one fourth engagement member selected from a hole, a through-hole, a recess or another kind of indentation for receiving a corresponding first engagement member of the first holding piece.

30. An active optical fiber cable comprising a number of optical fibers and at least one connector device of claim 1.

31. An active optical fiber cable comprising a number of optical fibers and two connector devices of claim 1, wherein each optical fiber comprises two end pieces and wherein, at either side of the number of optical fibers, a respective one of the two connector devices is mounted to the end pieces of the number of optical fibers.

32. A connector device for connecting at least one optical fiber endpiece to an electric terminal, the connector device comprising:
  a printed circuit board comprising electronic circuitry;
  an electric connector plug for connecting to an electric terminal, the connector plug being mounted to the printed circuit board;
  a fiber end piece holder securing at least one fiber end piece of at least one optical fiber in a position and an orientation for enabling propagation of electromagnetic radiation in a propagation direction substantially parallel to a main surface of the printed circuit board;
  an optoelectronic chip comprising at least one optoelectronic active element that emits or detects electromagnetic radiation transmissible via the at least one optical fiber;
  a layered optical stack comprising:
    a plurality of layers arranged in a stacked configuration such that a non-patterned layer of the plurality of layers is stacked on top of a patterned layer of the plurality of layers in a direction normal to the main surface of the printed circuit board, and
    at least one reflection surface;
  wherein the layered stack optically transmits signals of electromagnetic radiation between the at least one optical fiber end piece and the optoelectronic chip through the first layer and the second layer and changes a propagation direction of the electromagnetic radiation between a propagation direction substantially normal to the main surface of the printed circuit board and a propagation direction substantially parallel to the main surface of the printed circuit board;
  wherein the optoelectronic chip is mounted between the printed circuit board and the layered optical stack in an orientation enabling propagation of radiation in a propagation direction substantially normal to the main surface of the printed circuit board.

* * * * *

UNITED STATES PATENT AND TRADEMARK OFFICE
CERTIFICATE OF CORRECTION

PATENT NO. : 10,197,748 B2
APPLICATION NO. : 15/691020
DATED : February 5, 2019
INVENTOR(S) : Wojciech Piotr Giziewicz et al.

Page 1 of 1

It is certified that error appears in the above-identified patent and that said Letters Patent is hereby corrected as shown below:

On the Title Page

In Column 2, item (56), other publications, Line 1, delete "Internaitonal" and insert -- International --, therefor.

In the Specification

In Column 1, Line 9 (approx.), delete "befit" and insert -- benefit --, therefor.

In the Claims

In Column 15, Line 40 (approx.), Claim 22, delete "and/or or" and insert -- and/or --, therefor.

Signed and Sealed this
Third Day of September, 2019

Andrei Iancu
*Director of the United States Patent and Trademark Office*